US010089314B2

(12) United States Patent
Matsumoto et al.

(10) Patent No.: US 10,089,314 B2
(45) Date of Patent: Oct. 2, 2018

(54) INFORMATION MANAGEMENT METHOD, INFORMATION MANAGEMENT DEVICE, PROGRAM, AND PROGRAM PROVISION METHOD

(71) Applicant: Panasonic Intellectual Property Management Co., Ltd., Osaka-shi, Osaka (JP)

(72) Inventors: Takuya Matsumoto, Osaka (JP); Norihiro Matsui, Osaka (JP); Nozomu Tooyama, Osaka (JP); Gantetsu Matsui, Kyoto (JP)

(73) Assignee: PANASONIC IP MANAGEMENT CO., LTD., Osaka (JP)

( * ) Notice: Subject to any disclaimer, the term of this patent is extended or adjusted under 35 U.S.C. 154(b) by 520 days.

(21) Appl. No.: 14/422,649

(22) PCT Filed: Aug. 29, 2013

(86) PCT No.: PCT/JP2013/005104
§ 371 (c)(1),
(2) Date: Feb. 19, 2015

(87) PCT Pub. No.: WO2014/034116
PCT Pub. Date: Mar. 6, 2014

(65) Prior Publication Data
US 2015/0234843 A1    Aug. 20, 2015

(30) Foreign Application Priority Data

Aug. 30, 2012 (JP) ................................. 2012-189494

(51) Int. Cl.
*G06F 17/30* (2006.01)
*G06F 21/62* (2013.01)

(52) U.S. Cl.
CPC .... *G06F 17/30091* (2013.01); *G06F 21/6218* (2013.01)

(58) Field of Classification Search
CPC .................................................. G06F 17/30091
(Continued)

(56) References Cited

U.S. PATENT DOCUMENTS 4,711,313 A     12/1987  Iida et al.
8,160,988 B1 *   4/2012  Owen .................. G06N 99/005
                                                   706/11
(Continued)

FOREIGN PATENT DOCUMENTS

JP      63-85411 A      4/1988
JP    2004-312320 A    11/2004
(Continued)

OTHER PUBLICATIONS

International Search Report, and English language translation thereof, in corresponding International Application No. PCT/JP2013/005104, dated Oct. 29, 2013, 5 pages.

*Primary Examiner* — Hosain Alam
*Assistant Examiner* — Saba Ahmed
(74) *Attorney, Agent, or Firm* — Brinks Gilson & Lione

(57) ABSTRACT

An information management method allows presenting the usage of each of storage areas in a visually intuitive manner, the method including: obtaining user configuration information in each of the storage areas; receiving a designated user ID and obtaining user information corresponding to the designated user ID; and displaying an image, wherein when displaying an image, a first image is displayed for a storage area that stores user configuration information regarding a user identified by the designated user ID or the user information, a second image is displayed for a storage area that stores user configuration information regarding a user dif- (Continued)

ferent from the user identified by the designated user ID or the user information, and a third image is displayed for a storage area that stores user configuration information indicating that the storage area is not being used for any user.

13 Claims, 19 Drawing Sheets

(58) Field of Classification Search
USPC .......................................................... 707/783
See application file for complete search history.

(56) References Cited

U.S. PATENT DOCUMENTS

| | | | |
|---|---|---|---|
| 9,063,952 B2* | 6/2015 | Moraleda | G06F 17/30247 |
| 2006/0129333 A1 | 6/2006 | Ashida et al. | |
| 2006/0241360 A1 | 10/2006 | Montagnino et al. | |
| 2010/0185858 A1* | 7/2010 | Nishimi | H04L 63/08 |
| | | | 713/168 |
| 2011/0007901 A1* | 1/2011 | Ikeda | H04B 5/02 |
| | | | 380/270 |
| 2012/0302840 A1 | 11/2012 | Kubo | |
| 2012/0320412 A1* | 12/2012 | Yoshimura | G06F 3/1204 |
| | | | 358/1.15 |
| 2012/0327457 A1* | 12/2012 | Hoshina | G06F 3/1204 |
| | | | 358/1.15 |

FOREIGN PATENT DOCUMENTS

| | | |
|---|---|---|
| JP | 2005-45640 A | 2/2005 |
| JP | 2006-167073 A | 6/2006 |
| JP | 2006-209177 A | 8/2006 |
| JP | 2007-117525 A | 5/2007 |
| JP | 2011-183101 A | 9/2011 |

* cited by examiner

FIG. 12A

| User ID of operator |
|---|
| 0x00000001 |

FIG. 12B

| Slot number | User configuration information ||||| User history information ||
| | Slot state | User ID | User information || Latest measurement information ||
| | | | Age | Height | Date and time | Weight |
|---|---|---|---|---|---|---|
| 1 | User ID registered | 0x00000001 | 38 | 175 | 20130613 | 70.3 |
| 2 | User ID unregistered | — | 28 | 172 | 20120515 | 55.2 |
| 3 | User ID registered | 0x00000002 | 48 | 159 | 20130703 | 48.1 |
| 4 | Empty | — | — | — | — | — |
| ... | ... | ... | ... | ... | ... | ... |

| User ID | User information | | User history information | | ... |
| | Age | Height | Latest measurement information | | |
| | | | Date and time | Weight | ... |
|---|---|---|---|---|---|
| 0x00000001 | 38 | 175 | 20130612 | 70.5 | ... |
| 0x00000002 | 48 | 159 | 20130702 | 48.2 | ... |
| ... | ... | ... | ... | ... | ... |

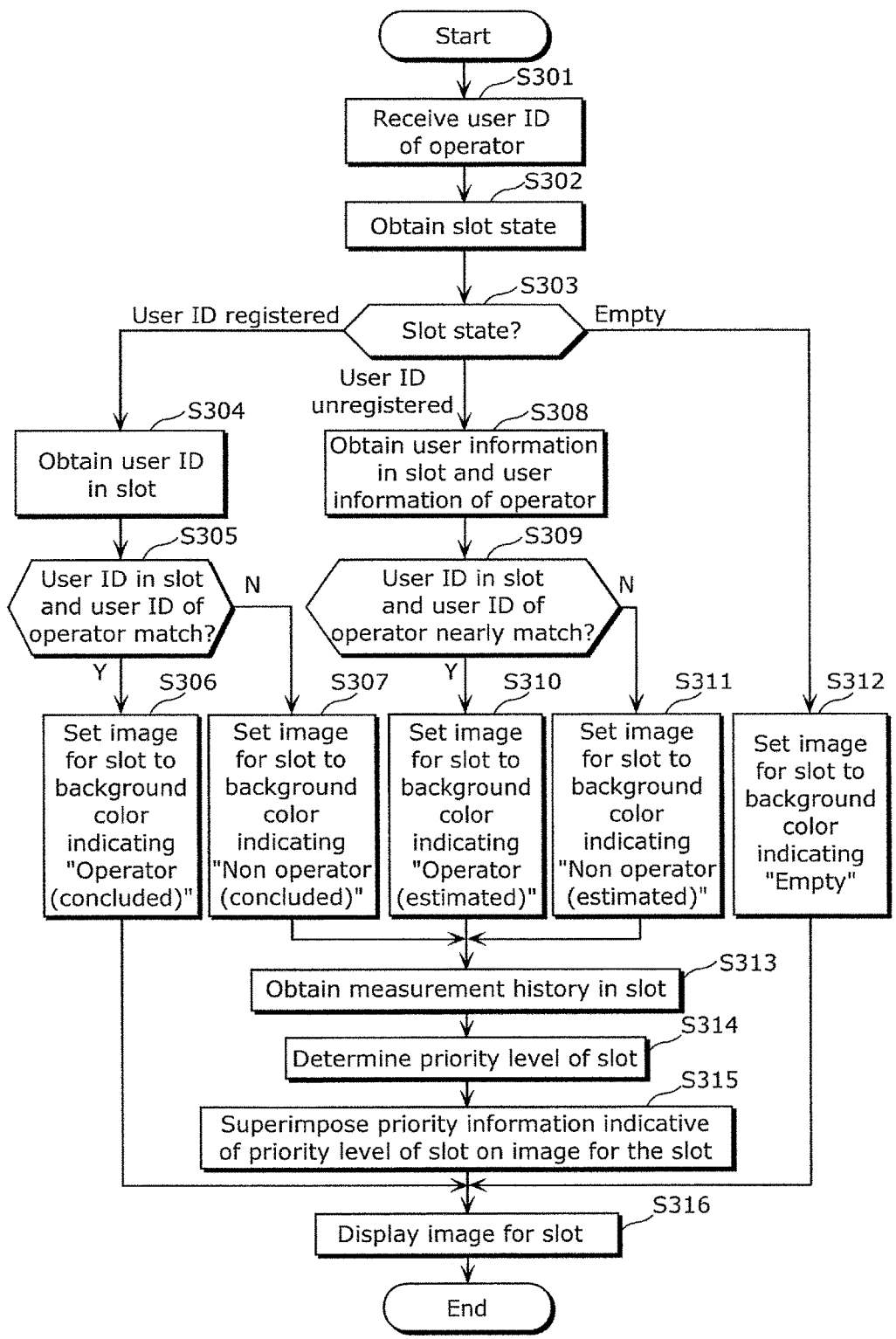

INFORMATION MANAGEMENT METHOD, INFORMATION MANAGEMENT DEVICE, PROGRAM, AND PROGRAM PROVISION METHOD

This application is a 371 application of PCT/JP2013/005104 having an international filing date of Aug. 29, 2013, which claims priority to JP2012-189494 filed Aug. 30, 2012, the entire contents of which are incorporated herein by reference.

TECHNICAL FIELD

The present invention relates to an information management method, information management device, program, and program provision method for managing a plurality of storage areas included in a home appliance.

BACKGROUND ART

Conventionally, weight scales which include a plurality of memories for storing weights of people are provided as home appliances. Also, as such a weight scale, a weight scale which includes means for determining, from measured weight, a memory to be used for a person currently on the weight scale among memories is proposed (e.g., see Patent Literature (PTL) 1). In other words, the means manages the memories (storage areas), and an information management method used by the means identifies, among the memories, the memory to be used for the person currently on the weight scale.

CITATION LIST

Patent Literature

[PTL 1] Japanese Unexamined Patent Application Publication No. S63-085411

SUMMARY OF INVENTION

Technical Problem

The information management method disclosed in PTL 1, however, has a problem that the usage of each memory in the home appliance is difficult for a user to visually understand.

The present invention is thus made in light of the problem above, and provides an information management method which allows presentation of the usage of each of storage areas in a visually intuitive manner.

Solution to Problem

An information management method according to an aspect of the present invention is an information management method for managing storage areas, including: (a) obtaining user configuration information stored in each of the storage areas from an apparatus including the storage areas, the user configuration information being information on a user stored in the storage area; (b) receiving a designated user ID which is a user ID that has been designated; (c) obtaining user information indicating a characteristic of a user identified by the designated user ID; and (d) displaying images associated with the storage areas, based on the designated user ID, the user information, and the user configuration information stored in each of the storage areas, wherein in step (d), a first image is displayed for a storage area of the storage areas which stores user configuration information regarding the user identified by one of the designated user ID and the user information, a second image different from the first image is displayed for a storage area of the storage areas which stores user configuration information regarding another user different from the user identified by the one of the designated user ID and the user information, and a third image different from the first image and the second image is displayed for a storage area of the storage areas which stores user configuration information indicating that the storage area is not being used for any user.

The general and specific aspect may be implemented using a system, a method, an integrated circuit, a computer program, or a computer-readable recording medium such as a CD-ROM, or any combination of systems, methods, integrated circuits, computer programs, or computer-readable recording media.

Advantageous Effects of Invention

The information management method according to the present invention allows presentation of the usage of each of storage areas in a visually intuitive manner.

BRIEF DESCRIPTION OF THE DRAWINGS

FIG. 12A is a diagram showing an example of a user ID according to the embodiment 3.

FIG. 12B is a diagram showing an example of information stored in an apparatus storage unit of the appliance according to the embodiment 3.

FIG. 18 is a flowchart illustrating processing operation of an information management device according to the variation of the embodiment 3.

Figure 1:
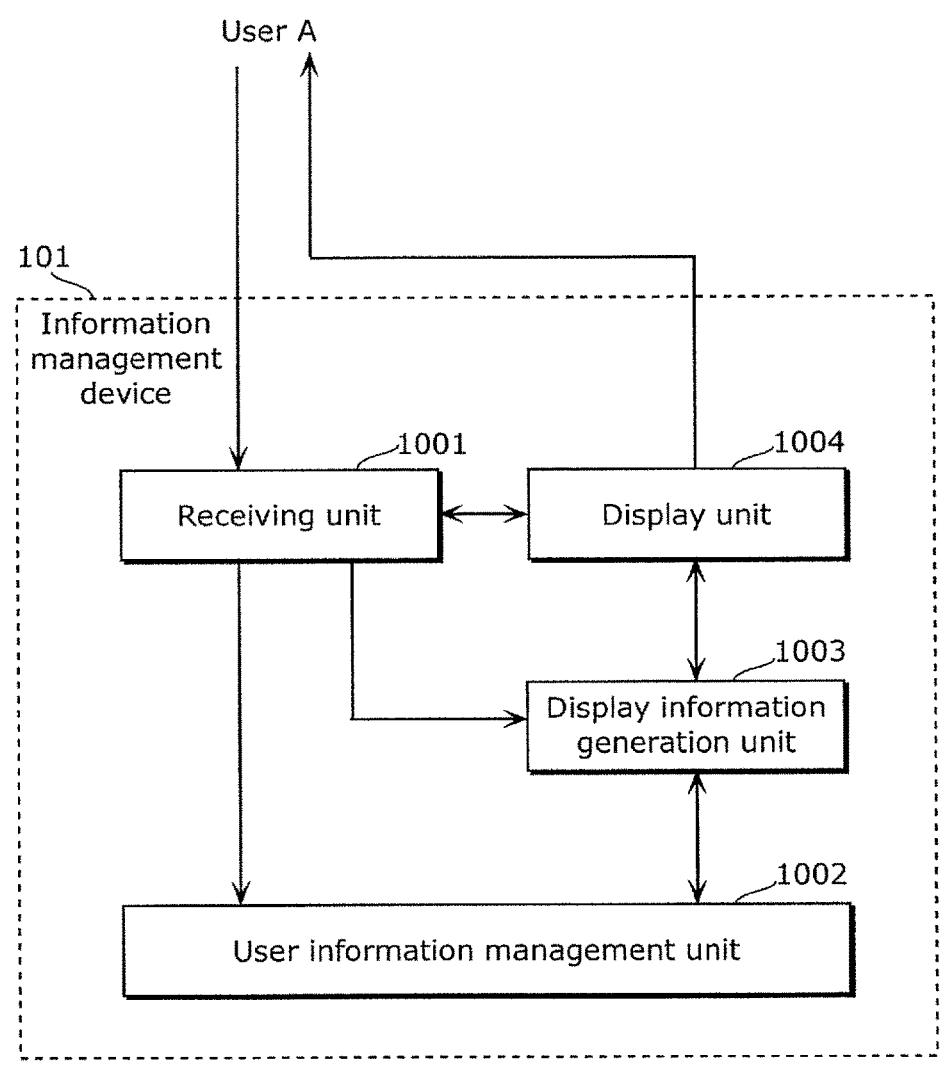
FIG. 1 is a block diagram showing a configuration of an information management device according to an embodiment 1.

DETAILED DESCRIPTION OF THE PREFERRED EMBODIMENTS (Underlying Knowledge Forming Basis of the Present Invention)

In relation to the conventional information management method described in the Background Art section, the inventors have found the following problems:

The conventional information management method described above compares weight of a person currently on the weight scale with weights of users stored in a plurality of memories to identify a memory, among the memories, that stores weight closest to the weight of the person currently on the weight scale as a memory to be used for the person currently on the weight scale. Then, the conventional information management method displays a number of the specified memory.

A memory switch is eliminated from the weight scale which uses the conventional information management method described above. This eliminates time of operating the memory switch and inconvenience, and, additionally, the body of the weight scale may be designed to be thin.

However, the weight scale does not present, to the user via a user interface, as to whether there is an available memory, which memory is an available memory, and whether the person in question who uses the weight scale to measure weight is already registered in a memory. Thus, the user may not judge whether to overwrite existing user information when users are registered to all a finite number of the memories. As a result, there arises a problem that the user may inadvertently overwrite user information of another user, or register redundant user information by mistake, for example.

In other words, while the conventional information management method shows the weight scale operator the number of the specified memory, the weight scale operator may not know the usage of each memory. For example, to use the weight scale, a process of registering the operator to any of the memories may be required in advance. In such a case, the operator may not know, for each memory, whether the operator is registered as a user of the memory, a person other than the operator is registered as the user of the memory, or no one is registered as the user of the memory.

To address such problems, an information management method according to an aspect of the present invention is an information management method for managing storage areas, including: (a) obtaining user configuration information stored in each of the storage areas from an apparatus including the storage areas, the user configuration information being information on a user stored in the storage area; (b) receiving a designated user ID which is a user ID that has been designated; (c) obtaining user information indicating a characteristic of a user identified by the designated user ID; and (d) displaying images associated with the storage areas, based on the designated user ID, the user information, and the user configuration information stored in each of the storage areas, wherein in step (d), a first image is displayed for a storage area of the storage areas which stores user configuration information regarding the user identified by one of the designated user ID and the user information, a second image different from the first image is displayed for a storage area of the storage areas which stores user configuration information regarding another user different from the user identified by the one of the designated user ID and the user information, and a third image different from the first image and the second image is displayed for a storage area of the storage areas which stores user configuration information indicating that the storage area is not being used for any user.

According to the above configuration, images associated with storage areas are each displayed in a mode in accordance with the relationship between a user identified by the user configuration information stored in the storage area and a user who is the operator identified by the designated user ID or the user information. Thus, the operator can visually and readily be aware of whether the storage areas are being used for other users or a storage area already being used for the operator. Additionally, the operator can visually and readily be aware of a storage area not being used for any user. In other words, the usage of each of the storage areas can be presented in a visually intuitive manner.

Moreover, in step (d), if the designated user ID and a user ID indicated by user configuration information in a storage area of the storage areas match, or if no user ID is indicated by the user configuration information and a characteristic indicated by the user information and a characteristic of the user indicated by the user configuration information in the storage area nearly match, the first image may be displayed for the storage area.

According to the above configuration, the first image is displayed for the storage area that stores the user ID which matches the designated user ID of the operator. Thus, the operator can readily find a storage area concluded being used for the operator. Moreover, even if the storage area does not have the user ID stored therein, the first image is displayed for the storage area if the storage area stores the user configuration information indicating a characteristic that nearly matches the operator's characteristic indicated by the user information. Thus, the operator can readily find a storage area estimated being used for the operator.

Moreover, in step (d), if the designated user ID and a user ID indicated by user configuration information in a storage area of the storage areas do not match, or if no user ID is indicated by the user configuration information and a characteristic indicated by the user information and a characteristic of the user indicated by the user configuration information in the storage area do not nearly match, the second image may be displayed for the storage area.

According to the above configuration, the second image is displayed for the storage area that stores the user ID which does not match the designated user ID of the operator. Thus, the operator can readily find the storage area concluded being used for another user. Even if the storage area do not have a user ID stored therein, the second image is displayed for the storage area if the storage area stores user configuration information indicating a characteristic that does not nearly match the operator's characteristic indicated by the user information. Thus, the operator can readily find a storage area estimated being used for another user.

Moreover, in step (d), a fourth image may be displayed as the first image if the designated user ID and a user ID indicated by user configuration information in the storage area of the storage areas match, and a fifth image different from the fourth image may be displayed as the first image if no user ID is indicated by the user configuration information, and the characteristic indicated by the user information and the characteristic of the user indicated by the user configuration information in the storage area nearly match.

According to the above configuration, an image associated with a storage area which stores a user ID that matches the designated user ID of the operator and an image associated with a storage area which stores user configuration information indicating a characteristics that nearly matches a characteristic indicated by the user information of the operator are displayed in visually distinguishable modes. Thus, the operator can readily be aware of whether the storage area is concluded being used for the operator or whether the storage area is estimated being used for the operator.

Moreover, in step (d), a sixth image may be displayed as the second image if the designated user ID and the user ID indicated by the user configuration information in the storage area of the storage areas do not match, and a seventh image different from the sixth image may be displayed as the second image if no user ID is indicated by the user configuration information and the characteristic indicated by the user information and the characteristic of the user indicated by the user configuration information in the storage area do not nearly match.

According to the above configuration, an image associated with a storage area which stores a user ID that does not match the designated user ID of the operator and an image associated with a storage area which stores user configuration information indicating a characteristics that does not nearly match a characteristic indicated by the user information of the operator are displayed in visually distinguishable modes. Thus, the operator can readily be aware of whether the storage area is concluded being used for another user or whether the storage area is estimated being used for another user.

Moreover, the information management method may further include: (e) obtaining history information indicating usage history of each of the storage areas from the apparatus; and (f) determining a priority level for each of the storage areas, using the obtained history information, wherein in step (d), priority information indicating the priority level determined for each of the storage areas is further displayed in association with the storage areas.

According to the above configuration, images associated with the plurality of storage areas and the priority levels of the storage areas are displayed. Thus, even if the same image is displayed for storage areas, for example, the operator can check the priority level that corresponds to that image to readily find a usable storage area among the storage areas associated with the image. For example, the operator can find a storage area that has a low priority level as being usable.

Moreover, in step (d), the first image, the second image, and the third image may be displayed in different background colors, different frame colors, or different text colors, or by different icons or different characters.

According to the above configuration, the first to third images can be readily identified visually.

Moreover, the information management method may further include: (g) selecting a storage area of the storage areas that is associated with an image designated among the images displayed in step (d); and (h) storing the designated user ID or the user information into the selected storage area as user configuration information in the selected storage area.

According to the above configuration, the designated user ID or the user information of the operator is registered as the user configuration information to the selected storage area, thereby registering the operator as a user of the storage area.

Moreover, the information management method may further include: (i) displaying a screen for an inquiry as to whether to store the designated user ID or the user information if a storage area, which stores user configuration information indicating a user ID that does not match the designated user ID, is selected in step (g); and (j) receiving a response to the inquiry on the screen, wherein in step (h), the designated user ID or the user information is stored if the response to store the user information is received in step (j).

According to the above configuration, if the operator has accidentally selected a storage area concluded being used for another user, a screen for an inquiry as to whether to store the designated user ID or the user information of the operator into the storage area is displayed. This prevents the operator from overwriting, by mistake, the user configuration information of another user already stored, with the designated user ID of the operator, as new user configuration information.

Moreover, the information management method may further include: (k) obtaining a pin code stored in the selected storage area; and (l) receiving a designated pin code, wherein in step (h), if the designated pin code received in step (l) and the pin code obtained in step (k) match, the designated user ID or the user information is stored.

According to the above configuration, the user ID or the user information of the operator is not stored as new user configuration information into a storage area if the pin code stored in the storage area and the designated pin code do not match, thus preventing false registration by the operator.

Moreover, to solve the conventional problems, the first aspect of the present invention is an information management device including: a receiving unit which receives input of a user ID to identify a user and user information which is information on the user identified by the user ID; a user information management unit which stores a plurality of user IDs and user information associated with each of the user IDs, the user information management unit being able to register N user IDs; a display unit which displays a listing of N graphic regions that are associated with the user IDs on a screen; and a display information generation unit which generates display information for displaying the graphic regions on the display unit, wherein the display information generation unit generates the display information in such a manner that a graphic region associated with a user ID that matches the user ID received by the receiving unit, a graphic region associated with a user ID that does not match the user ID received by the receiving unit, and a graphic region that is not associated with any of the user IDs have different forms.

According to the above configuration, the listing of the graphic regions corresponding to the respective user IDs can be displayed, distinguishing between a state associated with the user ID received by the receiving unit, a state associated with another user ID, and a state associated with no user ID.

Moreover, in managing a plurality of pieces of user information, a user can be provided with information which allows the user to readily judge a slot to which the user information of his/her own should be registered.

As described above, in registering the user information to a slot (the storage area) included in the user information management unit, the information management device of the first aspect displays which of the N slots is an empty slot and whether each slot stores the user information of the user in question who is about to make a registration, in a manner visually recognizable to the user, thereby providing a mechanism which prevents a registrant (the operator) from inadvertently making a registration to a slot for a user other than the registrant.

Moreover, such improved usability can be provided in registering the user information to a home appliance that allows a user to readily select a slot to make a registration to and prevents the user from making a wrong user information registration, without relying on user's memory or even if a memory switch is eliminated.

The second aspect of the present invention, particularly in the first aspect, is that the receiving unit receives direct input and indirect input via an external device, and thus the display information is generated in such a manner that a graphic region associated with a user ID that matches the user ID registered via the direct input and a graphic region associated with a user ID that matches the user ID registered via the indirect input have different forms.

According to the above configuration, the listing of the graphic regions corresponding to the respective user IDs can be displayed, distinguishing a user ID registered via the direct input and a user ID registered via the indirect input received by the receiving unit.

The third aspect of the present invention, particularly in one of the first and the second aspects, is that the display information generation unit generates the display information in such a manner that the graphic regions can be distinguished, using background colors in different forms.

According to the above configuration, the listing of the graphic regions can be displayed in a representation that allows the user to visually differentiate between users.

The fourth aspect of the present invention, particularly in one of the first and the second aspects, is that the display information generation unit generates the display information in such a manner that the graphic regions can be distinguished, using frame colors in different forms.

According to the above configuration, the listing of the graphic regions can be displayed in a representation that allows the user to visually differentiate between users.

The fifth aspect of the present invention, particularly in one of the first and the second aspects, is that the display information generation unit generates the display information in such a manner that the graphic regions can be distinguished, using icons in different forms.

According to the above configuration, the listing of the graphic regions can be displayed in a representation that allows the user to visually differentiate between users.

The sixth aspect of the present invention, particularly in one of the first and the second aspects, is that the display information generation unit generates the display information in such a manner that the graphic regions can be distinguished, using characters in different forms.

According to the above configuration, the listing of the graphic regions can be displayed in a representation that allows the user to visually differentiate between users.

The seventh aspect of the present invention, particularly in one of the first and the second aspects, is that the display information generation unit generates the display information in such a manner that the graphic regions can be distinguished, using text colors in different forms.

According to the above configuration, the listing of the graphic regions can be displayed in a representation that allows the user to visually differentiate between users.

The eighth aspect of the present invention, particularly in one of the first to the seventh aspects, is registering or updating the user information received by the receiving unit if the user ID received by the receiving unit and the user ID indicated by region identifying information match.

According to the above configuration, only a user whose user ID has been received by the receiving unit is allowed to change the user information of his/her own.

The ninth aspect of the present invention, particularly in the eighth invention, is generating display information regarding a screen for an inquiry as to whether the user information received by the receiving unit may be registered or updated, if the user ID received by the receiving unit and the user ID indicated by the region identifying information do not match.

According to the above configuration, a user of the user ID received by the receiving unit can be prevented from inadvertently changing the user information other than his/her own.

The tenth aspect of the present invention, particularly in one of the eighth and the ninth aspects, is storing the user ID, the user information, and a pin code in association and registering or updating the user information received by the receiving unit if the pin code associated with the user ID indicated by the region identifying information and a pin code received by the receiving unit match.

According to the above configuration, change of the user information by an unauthorized user can be prevented.

The eleventh aspect of the present invention is an information management method including: (a) receiving input of a user ID to identify a user and user information which is information on the user identified by the user ID; (b) displaying on a screen, using a user information management unit which stores a plurality of user IDs and user information associated with each of the user IDs and is able to register N user IDs, a listing of N graphic regions that are associated with the user IDs; and (c) generating display information for displaying the graphic regions, wherein in step (c), the display information is generated in such a manner that a graphic region associated with a user ID that matches the user ID received in step (a), a graphic region associated with a user ID that does not match the user ID received in step (a), and a graphic region that is not associated with any of the user IDs have different display forms.

According to the above configuration, in displaying the listing of registered user information on a screen, the user registration status can be presented to the user.

Hereinafter, embodiments will be described in detail, with reference to the accompanying drawings.

It should be noted that the embodiments described below are general and specific illustration. Values, shapes, materials, components, arrangement or connection between the components, steps, and the order of the steps described in the following embodiments are merely illustrative and not intended to limit the present invention. Moreover, among components of the embodiments below, components not set forth in the independent claims indicating the top level concept of the present invention will be described as optional components.

(Embodiment 1)

FIG. 1 is a block diagram showing a configuration of an information management device according to an embodiment 1.

In FIG. 1, an information management device 101 includes a receiving unit 1001, a user information management unit 1002, a display information generation unit 1003, and a display unit 1004.

The receiving unit 1001 receives a user ID for identifying a user, and user information regarding the user identified by the user ID. The receiving unit 1001 sends the received user ID to the display information generation unit 1003.

The user information management unit 1002 stores a plurality of user IDs and pieces of user information in association. N user IDs can be registered.

The display information generation unit 1003 obtains the received user ID from the receiving unit 1001, and obtains, from the user information management unit 1002, the user IDs of all N users registered. Furthermore, the display information generation unit 1003 generates display information for all N user IDs in such a manner that a graphic region associated with a user ID that matches the user ID received by the receiving unit 1001, a graphic region associated with a user ID that does not match the user ID received by the receiving unit 1001, and a graphic region that is not associated with any of the user IDs have different forms. Furthermore, the display information generation unit 1003 sends the generated display information to the display unit 1004.

The display unit 1004 displays a listing of N graphic regions which are associated with the user IDs from the display information obtained from the display information generation unit 1003.

According to such a configuration, the display information generation unit 1003 of the information management device 101 obtains the received user ID from the receiving unit 1001, and obtains, from the user information management unit 1002, the user IDs of all N users registered. Furthermore, the display information generation unit 1003 generates display information for all N user IDs in such a manner that a graphic region associated with a user ID that matches the user ID received by the receiving unit 1001, a graphic region associated with a user ID that does not match the user ID received by the receiving unit 1001, and a graphic region that is not associated with any of the user IDs have different forms. Then, the display unit 1004 can display the listing of the N graphic regions associated with the user IDs based on the display information obtained from the display information generation unit 1003.

This allows the listing of the graphic regions corresponding to the respective user IDs to be displayed, distinguishing between a state associated with the user ID received by the receiving unit 1001, a state associated with another user ID, and a state associated with no user ID.

Figure 2:
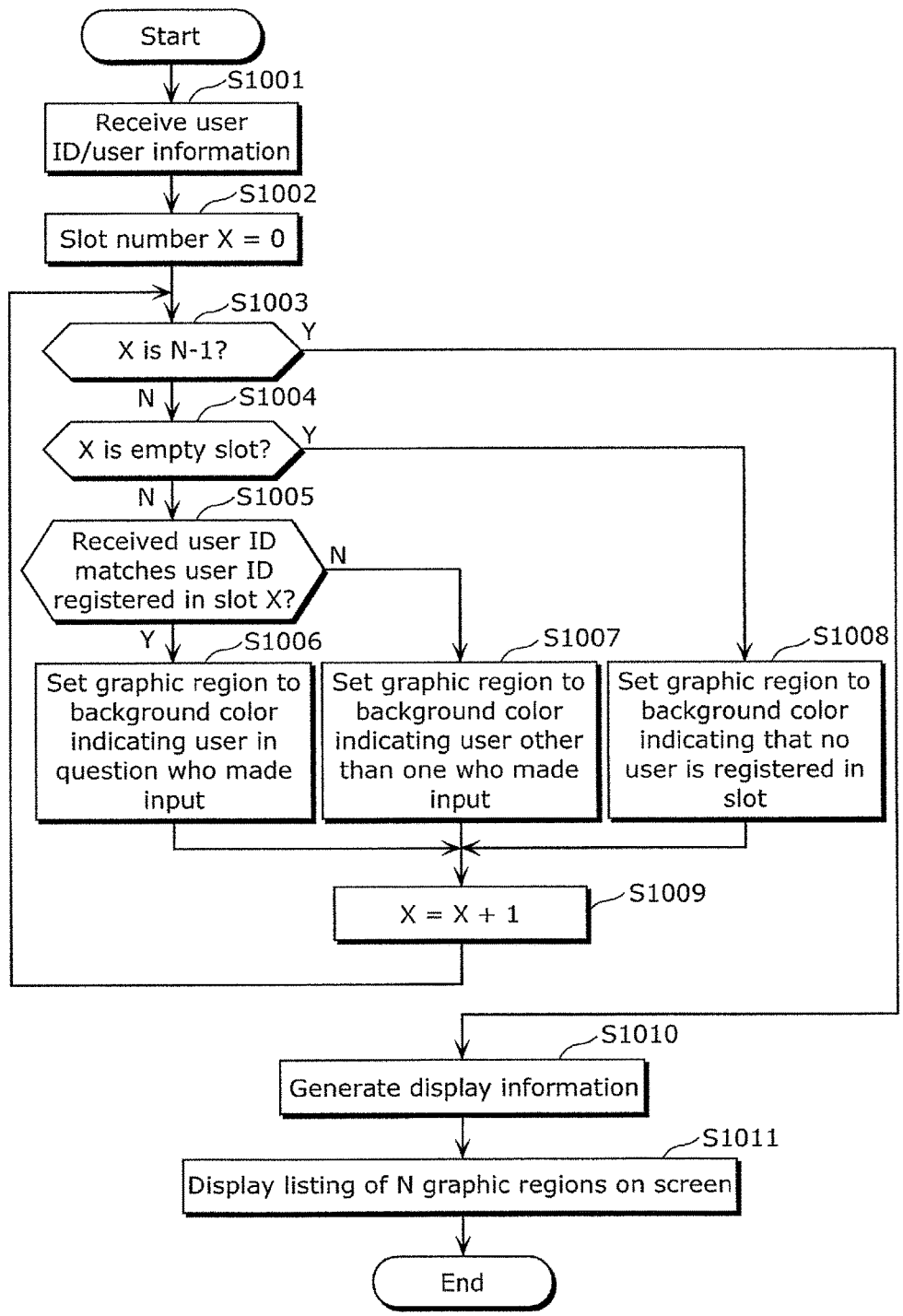
FIG. 2 is a diagram illustrating a control flow of the information management device according to the embodiment 1.

FIG. 2 is a diagram illustrating a control flow of the information management device 101 according to the embodiment 1.

In FIG. 2, first, the receiving unit 1001 receives input of a user ID which identifies a user and user information regarding the user identified by the user ID, and sends the received user ID to the display information generation unit 1003 (step S1001).

The user information management unit 1002 stores a plurality of user IDs and pieces of user information associated with the user IDs. Up to N user IDs can be registered in the user information management unit 1002. In the following, a memory to which the user ID and the user information are registered will be referred to as a slot, and the user information management unit 1002 manages N slots.

Next, the display information generation unit 1003 obtains from the user information management unit 1002 the user IDs registered to the N slots, and sets a slot number X to 0 (step S1002) to check the user ID of each slot thereafter.

Next, the display information generation unit 1003 determines whether checking of all the slots has been completed. Specifically, if the slot number X is N−1, the display information generation unit 1003 proceeds to step S1010 as having completed the checking of the user IDs in all the slots. Otherwise, the display information generation unit 1003 proceeds to step S1004 (step S1003).

Next, the display information generation unit 1003 determines whether a user ID is registered (contained or stored) in a slot that has the slot number X, that is, whether the slot that has the slot number X is an empty slot. The display information generation unit 1003 proceeds to step S1008 if the slot having the slot number X is an empty slot. Otherwise, the display information generation unit 1003 proceeds to step S1005 (step S1004).

Next, the display information generation unit 1003 compares if the user ID received by the receiving unit 1001 and the user ID in the slot having the slot number X match. The display information generation unit 1003 proceeds to step S1006 if the user ID received by the receiving unit 1001 and the user ID in the slot having the slot number X match. Otherwise, the display information generation unit 1003 proceeds to step S1007 (step S1005).

Next, if the slot having the slot number X is determined to be an empty slot in step S1004, the display information generation unit 1003 sets a background color of a graphic region, which is display information and corresponding to the slot having the slot number X, to a background color indicating that no user is registered to the slot (step S1008). If the user ID received by the receiving unit 1001 and the user ID in the slot having the slot number X are determined to match each other in step S1005, the display information generation unit 1003 sets the background color of the graphic region, which is the display information and corresponding to the slot having the slot number X, to a background color indicating the user in question who made the input of the user ID and the user information (step S1006). On the other hand, if the user ID received by the receiving unit 1001 and the user ID in the slot having the slot number X are determined not to match each other in step S1005, the display information generation unit 1003 sets the background color of the graphic region, which is the display information and corresponding to the slot having the slot number X, to a background color indicating a user other than one who made the input (step S1007). After completing the process of step S1006, S1007, or S1008, the display information generation unit 1003 proceeds to step S1009.

After the background color is set to the graphic region which is the display information and corresponding to the slot having the slot number X (steps S1006, S1007, S1008), the display information generation unit 1003 increments the slot number X by 1 and returns to step S1003 to check for the next slot (step S1009).

If determined in step S1003 that the checking of the user IDs in all the slots has been completed (when the slot number X matches N−1), the display information generation unit 1003 generates display information to be displayed on the display unit 1004, based on a result of the background colors (steps S1006, S1007, S1008) set to the graphic regions corresponding to all the N slots undergone the checking, and sends the display information to the display unit 1004 (step S1010).

Last, the display unit 1004 displays, on a screen, the listing of the N graphic regions which are associated with the user IDs in the slots based on the display information obtained from the display information generation unit 1003 (step S1011).

Figure 3:
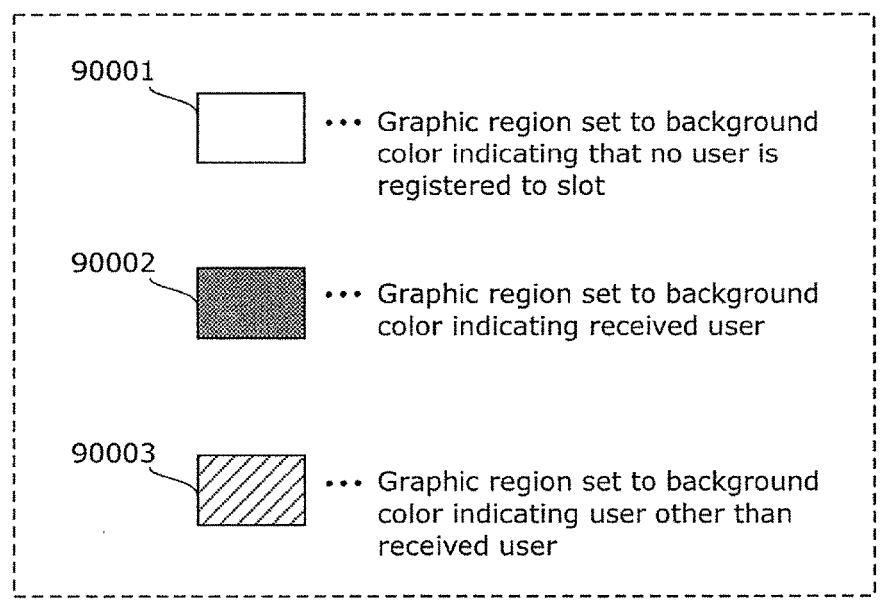
FIG. 3 is a diagram conceptually illustrating background color settings of graphic regions according to the embodiment 1.

FIG. 3 is a diagram conceptually illustrating an example of the background colors of the graphic regions set in steps S1006, S1007, and S1008. In FIG. 3, a graphic region 90001, a graphic region 90002, a graphic region 90003 are examples of a graphic region set to a background color (white) indicating that no user is registered to the slot, a graphic region set to a background color (black) indicating a user in question whose user ID has been received, and a graphic region set to a background color (hatching) indicating a user other than the one whose user ID has been received, respectively. As shown in FIG. 3, the display information is generated in such a manner that the graphic regions have different forms depending on a state of a corresponding slot.

Figure 4:
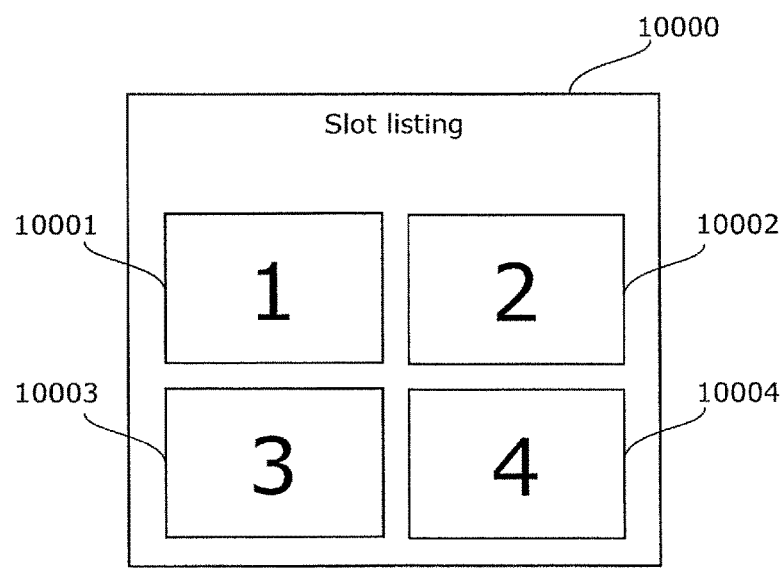
FIG. 4 is a diagram conceptually illustrating a graphic region listing when no user is registered in the embodiment 1.
Figure 5:
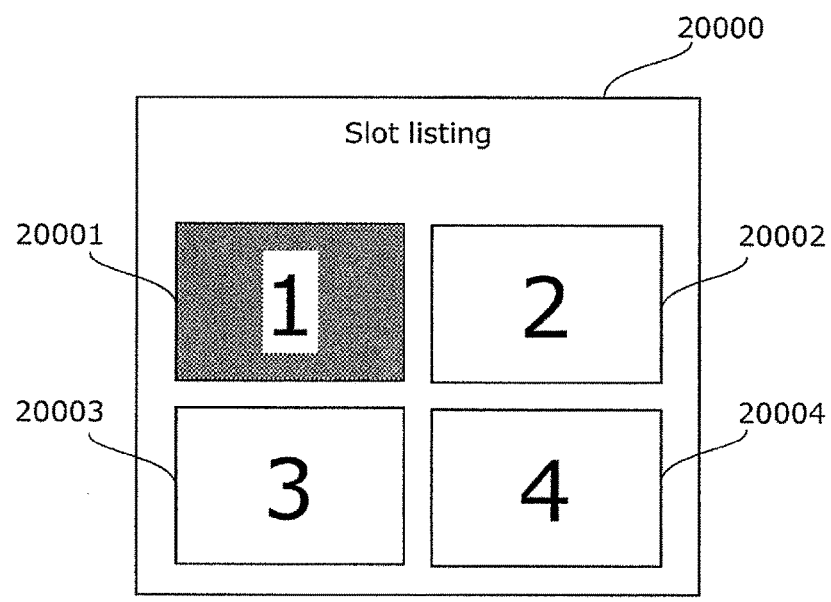
FIG. 5 is a diagram conceptually illustrating the graphic region listing when there is a user registered who matches a user received in the embodiment 1.
Figure 6:
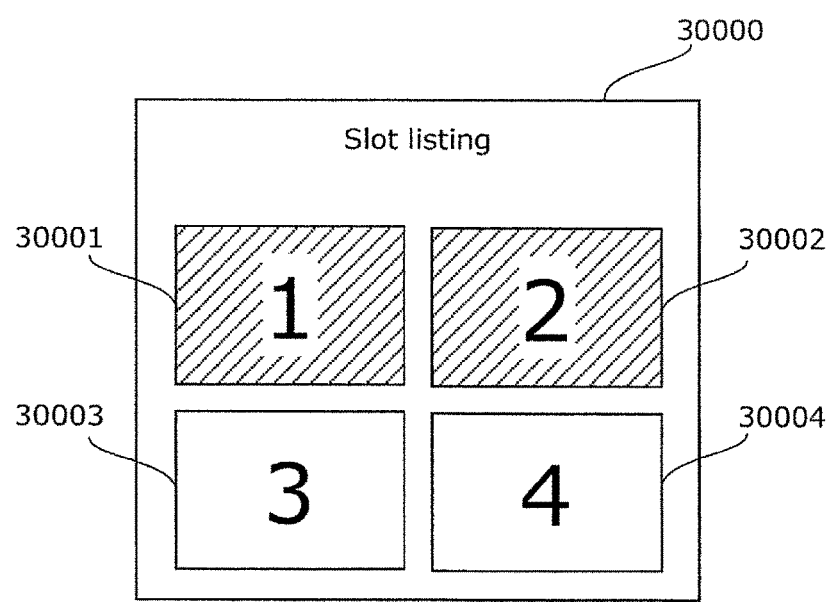
FIG. 6 is a diagram conceptually illustrating the graphic region listing when there are users registered who do not match the user received in the embodiment 1.

FIGS. 4, 5, and 6 are diagrams conceptually illustrating the graphic region listing when the number N of slots which can be managed by the user information management unit 1002 is four slots. The background colors of the graphic regions in each figure are based on the background colors of the graphic regions shown in FIG. 3.

FIG. 4 is a diagram conceptually illustrating the graphic region listing when no user ID is registered. Specifically, FIG. 4 shows the graphic region listing when no slot is registered with a user ID. In other words, FIG. 4 shows the graphic region listing when no slot is associated with a user ID, wherein there is no slot to which a user ID that matches the user ID received by the receiving unit 1001 is registered, or a slot to which a user ID that does not match the user ID received by the receiving unit 1001 is registered. More specifically, a listing of a graphic region 10001 corresponding to a slot 1, a graphic region 10002 corresponding to a slot 2, a graphic region 10003 corresponding to a slot 3, and a graphic region 10004 corresponding to a slot 4 are displayed on the slot listing display screen 10000. The graphic region 10001, the graphic region 10002, the graphic region 10003, and the graphic region 10004 are displayed in the background color indicating that no user ID is registered to a corresponding slot.

FIG. 5 is a diagram conceptually illustrating the graphic region listing when there is a user registered who matches a user received. In other words, in the graphic region listing shown in FIG. 5, the slot 1 is displayed as a slot to which a user ID that matches the user ID received by the receiving unit 1001 is registered. The slot 2, the slot 3, and the slot 4 are displayed as slots not associated with any user ID. Specifically, the listing of a graphic region 20001 corresponding to the slot 1, a graphic region 20002 corresponding to the slot 2, a graphic region 20003 corresponding to the slot 3, and a graphic region 20004 corresponding to the slot 4 is displayed on the slot listing display screen 20000. The graphic region 20001 is displayed in the background color indicating the received user in question. The graphic region 10002, the graphic region 10003, and the graphic region 10004 are displayed in the background color indicating that no user ID is registered to a corresponding slot.

FIG. 6 is a diagram conceptually illustrating the graphic region listing when there is a user registered who does not match a user received. In other words, in the graphic region listing shown in FIG. 6, the slot 1 and the slot 2 are displayed as slots to which user IDs that do not match the user ID received by the receiving unit 1001 are registered. The slot 3 and the slot 4 are displayed as slots not associated with any user ID. Specifically, the listing of a graphic region 30001 corresponding to the slot 1, a graphic region 30002 corresponding to the slot 2, a graphic region 30003 corresponding to the slot 3, and a graphic region 30004 corresponding to the slot 4 is displayed on the slot listing display screen 30000. The graphic region 30001 and the graphic region 30002 are displayed in the background color indicating users other than the received user. The graphic region 30003 and the graphic region 30004 are displayed in the background color indicating that no user ID is registered to corresponding slots.

According to the above, the information management device 101 can display the listing of the graphic regions corresponding to the respective user IDs, distinguishing between the state associated with the user ID received by the receiving unit 1001, the state associated with another user ID, and the state associated with no user ID.

(Embodiment 2)

Figure 7:
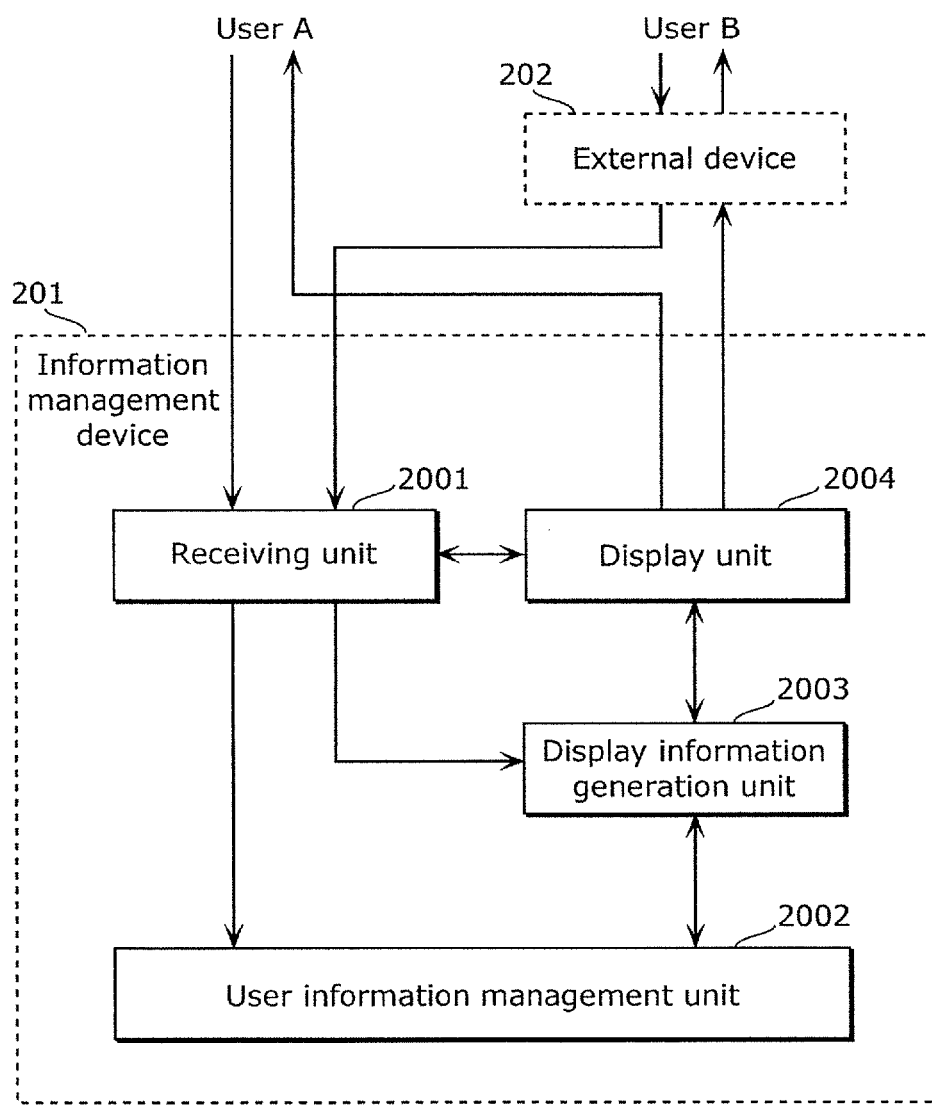
FIG. 7 is a block diagram showing a configuration of an information management device according to an embodiment 2.

FIG. 7 is a block diagram showing a configuration of an information management device according to an embodiment 2.

In FIG. 7, an information management device 201 includes a receiving unit 2001, a user information management unit 2002, a display information generation unit 2003, and a display unit 2004.

An external device 202 in FIG. 7 is a device which remotely operates the information management device 201 via communications.

The receiving unit 2001 can receive direct input to the receiving unit 2001 and indirect input thereto via the external device 202 to receive input of a user ID which identifies a user and user information regarding the user identified by the user ID. The receiving unit 2001 sends the received user ID to the display information generation unit 2003.

The user information management unit 2002 stores a plurality of user IDs and pieces of user information associated with the user IDs. Up to N user IDs can be registered in the user information management unit 2002. Furthermore, the user information management unit 2002 stores input method determination information for determining whether the user ID and the user information associated with the user ID are directly input or indirectly input.

The display information generation unit 2003 obtains the received user ID from the receiving unit 2001 and obtains the user IDs and the input method determination information of all N users registered to slots from the user information management unit 2002. Furthermore, the display information generation unit 2003 generates display information for all N user IDs in such a manner that a graphic region associated with a user ID that matches the user ID registered via directly input, a graphic region associated with a user ID that matches the user ID registered via indirect input have different forms. Furthermore, the display information generation unit 2003 sends the generated display information to the display unit 2004.

The display unit 2004 displays, on a screen, the listing of the N graphic regions which are associated with the user IDs in the slots based on the display information obtained from the display information generation unit 2003.

According to such a configuration, the display information generation unit 2003 of the information management device 201 generates the display information for all N user IDs in such a manner that the graphic region associated with a user ID that matches the user ID registered via direct input and the graphic region associated with a user ID that matches the user ID registered via indirect input have different forms. Then, the display unit 2004 can display the listing of the N graphic regions associated with the user IDs based on the display information obtained from the display information generation unit 2003.

This allows display of the listing of the graphic regions corresponding to the respective user IDs, distinguishing between the user information registered via direct input and the user information registered via indirect input.

Figure 8:
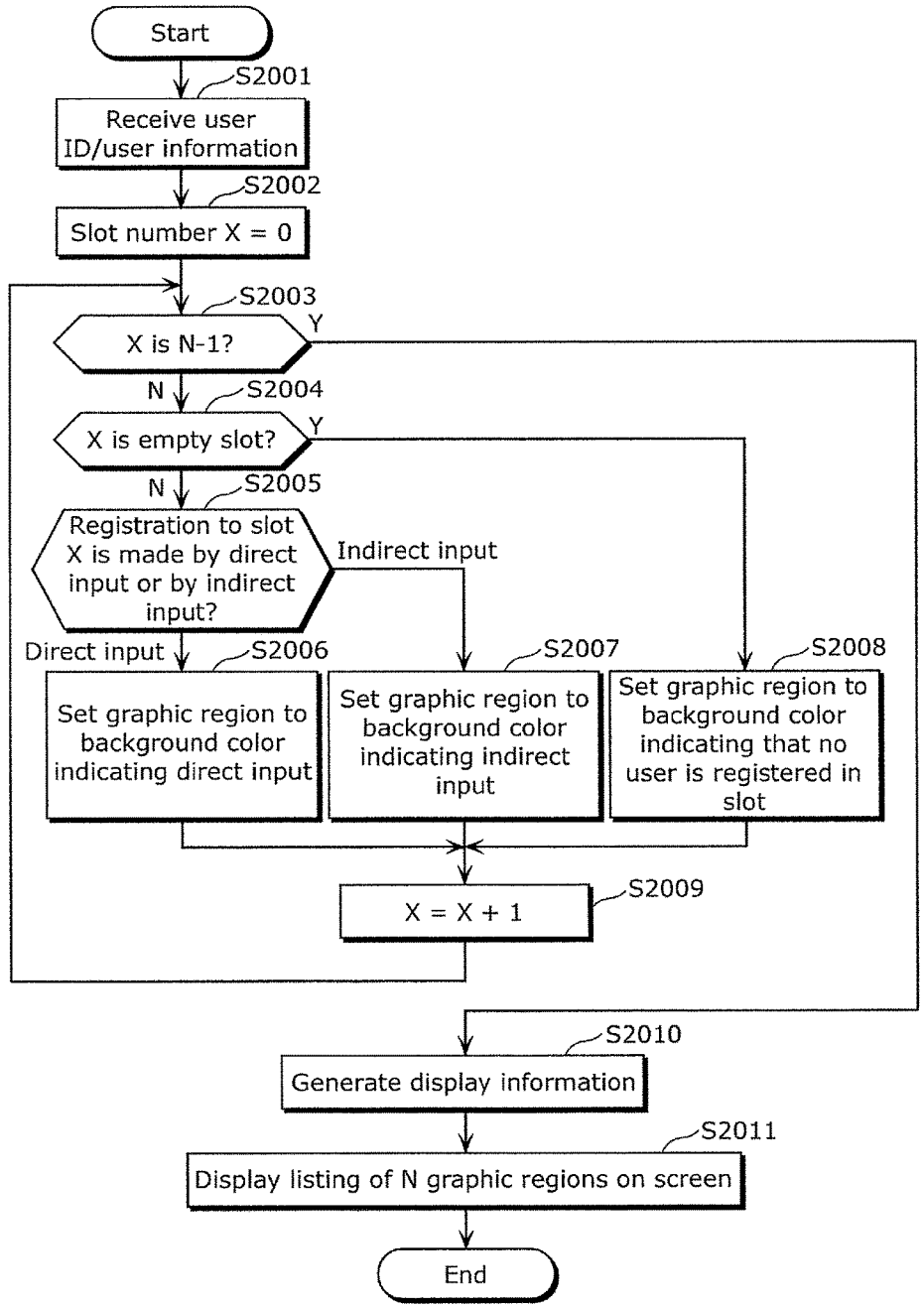
FIG. 8 is a diagram illustrating a control flow of the information management device according to the embodiment 2.

FIG. 8 is a diagram illustrating a control flow of the information management device 201 according to the embodiment 2.

In FIG. 8, first, the receiving unit 2001 receives input of a user ID which identifies a user and user information regarding the user identified by the user ID through direct input to the receiving unit 2001 or indirect input thereto via the external device 202. The receiving unit 2001 then sends the received user ID to the display information generation unit 2003 (step S2001).

The user information management unit 2002 stores a plurality of user IDs and pieces of user information associated with the user IDs. Up to N user IDs can be registered in the user information management unit 2002. Furthermore, the user information management unit 2002 stores input method determination information for determining whether the user ID and the user information associated with the user ID is directly input or indirectly input. In the following, a memory to which the user ID, the user information, and the input method determination information are registered will be referred to as a slot, and the user information management unit 2002 manages N slots.

Next, the display information generation unit 2003 obtains from the user information management unit 2002 the user ID and the input method determination information registered to the N slots, and sets a slot number X to 0 (step S2002) to check the user ID and the input method determination information in each slot thereafter.

Next, the display information generation unit 2003 determines whether checking of all the slots has been completed. Specifically, if the slot number X is N−1, the display information generation unit 2003 proceeds to step S2010 as having completed the checking of the user IDs in all the slots. Otherwise, the display information generation unit 2003 proceeds to step S1004 (step S2003).

Next, the display information generation unit 2003 determines whether a user ID is registered (contained or stored) in a slot that has the slot number X, that is, whether the slot that has the slot number X is an empty slot. The display information generation unit 2003 proceeds to step S2008 if the slot having the slot number X is an empty slot. Otherwise, the display information generation unit 2003 proceeds to step S2005 (step S2004).

Next, the display information generation unit 2003 checks if the input method determination information in the slot that has the slot number X indicates that the user ID and the user information associated with the user ID is directly input or indirectly input. If the input method determination information indicates direct input the display information generation unit 2003 proceeds to step S2006. If the input method determination information indicates indirect input the display information generation unit 2003 proceeds to step S2007 (step S2005).

Next, if the slot having the slot number X is determined to be an empty slot in step S2004, the display information generation unit 2003 sets a background color of a graphic region, which is display information and corresponding to the slot having the slot number X, to a background color indicating that no user is registered to the slot (step S2008). If the input method determination information in the slot having the slot number X is determined to indicate direct input in step S2005, the display information generation unit 2003 sets the background color of the graphic region, which is the display information and corresponding to the slot having the slot number X, to a background color indicating direct input (step S2006). On the other hand, if the input method determination information in the slot having the slot number X is determined to indicate indirect input in step S2005 the display information generation unit 2003 sets the background color of the graphic region, which is the display information and corresponding to the slot having the slot number X, to a background color indicating indirect input (step S2007). After completing the process of step S2006, S2007, or S2008, the display information generation unit 2003 proceeds to step S2009.

After the background color is set to the graphic region which is the display information and corresponding to the slot having the slot number X (steps S2006, S2007, S2008), the display information generation unit 2003 increments the slot number X by 1 and returns to step S2003 to check for the next slot (step S2009).

If determined in step S2003 that the checking of the user IDs in all the slots has been completed (when the slot number X matches N−1), the display information generation unit 2003 generates display information to be displayed on the display unit 2004, based on a result of the background colors (steps S2006, S2007, S2008) set to the graphic regions corresponding to all the N slots undergone the checking, and sends the display information to the display unit 2004 (step S2010).

Last, the display unit 2004 displays, on a screen, the listing of the N graphic regions which are associated with the user IDs in the slots based on the display information obtained from the display information generation unit 2003.

This allows display of the listing of the graphic regions corresponding to the respective user IDs, distinguishing between the user information registered via direct input and the user information registered via indirect input.

(Variation of Embodiment 1 or 2)

While in the embodiments 1 and 2, the display information generation unit 1003 or the display information generation unit 2003 generates the display information in such a manner that the graphic regions have different forms, it should be noted that the display information may be generated in such a manner that a state of each slot can be distinguished, using different background colors, different frame colors, different icons, different characters, or different text colors for different graphic regions. This allows the listing of the graphic regions to be displayed in a representation that allows the user to visually differentiate a slot state (a user) from another.

While in the embodiments 1 and 2, to determine that a slot is not associated with a user ID (the slot is an empty slot), the display information generation unit 1003 or the display information generation unit 2003 determines if the user ID is registered to the slot (if the slot is an empty slot), it should be noted that the display information generation unit 1003 or the display information generation unit 2003 may determine if user information is registered to the slot, may further determine if predetermined information is registered in the user information, or may separately provide information other than the user ID and the user information (e.g., information indicating whether no user is registered to the slot or whether the slot is an empty slot) to determine that the slot is not associated with a user ID.

It should be noted that in the embodiments 1 and 2, a function may be provided that the receiving unit 1001 or the receiving unit 2001 receives, together with a user ID and user information, region identifying information, which is a user ID corresponding to a graphic region displayed on the display unit 1004 or the display unit 2004, and if the user ID received by the receiving unit 1001 or the receiving unit 2001 and the user ID indicated by the region identifying information match, the user information management unit 1002 or the user information management unit 2002 registers or updates the user information received by the receiving unit 1001 or the receiving unit 2001.

This can prevent a user of the user ID received by the receiving unit 1001 or the receiving unit 2001 from inadvertently changing the user information other than his/her own. Additionally, if the user ID received by the receiving unit 1001 or the receiving unit 2001 and the user ID indicated by the region identifying information do not match, the display unit 1004 or the display unit 2004 may generate display information regarding a screen for an inquiry as to whether the user information received by the receiving unit 1001 or the receiving unit 2001 may be registered or updated.

This can prevent a user of the user ID received by the receiving unit from inadvertently changing user information other than his/her own. Additionally, the receiving unit 1001 or the receiving unit 2001 may further receive a pin code, and the user information management unit 1002 or the user information management unit 2002 may store the user ID, the user information, and the pin code in association, and the user information management unit 1002 or the user information management unit 2002 may register or update the user information received by the receiving unit 1001 or the receiving unit 2001 if the pin code associated with the user ID indicated by the region identifying information and the pin code received by the receiving unit 1001 or the receiving unit 2001 match. This can prevent change of the user information by an unauthorized user.

It should be noted that the communications between the information management device 201 and the external device 202 according to the embodiment 2 may be any means insofar as data can be communicated, such as wired communication, communications using an IC chip and IC reader/writer, or wireless communication, such as infrared, Wi-Fi, or Bluetooth (registered trademark).

It should be noted that in the information management device 201 according to the embodiment 2, the display information generation unit 2003 may generate the display information in such a manner that the graphic region associated with a user ID that matches a user ID having been registered to a slot via direct input, the graphic region associated with a user ID that matches a user ID having been registered to a slot via indirect input, and additionally, the graphic region associated with a user ID that matches the user ID received by the receiving unit, the graphic region associated with a user ID that does not match the user ID received by the receiving unit, and the graphic region that is not associated with any user ID have different forms so that a sum or product of these conditions can be distinguished.

It should be noted that in the embodiment 1, the display unit 1004 may be implemented as a function of the external device 202, rather than the internal function of the information management device 101. Moreover, in the embodiment 1, the display unit 1004 and the display information generation unit 1003 may be implemented as functions of the external device 202, rather than the internal functions of the information management device 101.

It should be noted that in the embodiment 2, the display unit 2004 may be implemented as a function of the external device 202, rather than the internal function of the information management device 201. Moreover, in the embodiment 2, the display unit 2004 and the display information generation unit 2003 may be implemented as functions of the external device 202, rather than the internal functions of the information management device 201.

(Embodiment 3)

An information management device according to the present embodiment has a feature of displaying, for each slot, an image indicating details of relationship between the slot and an operator of the information management device.

Figure 9:
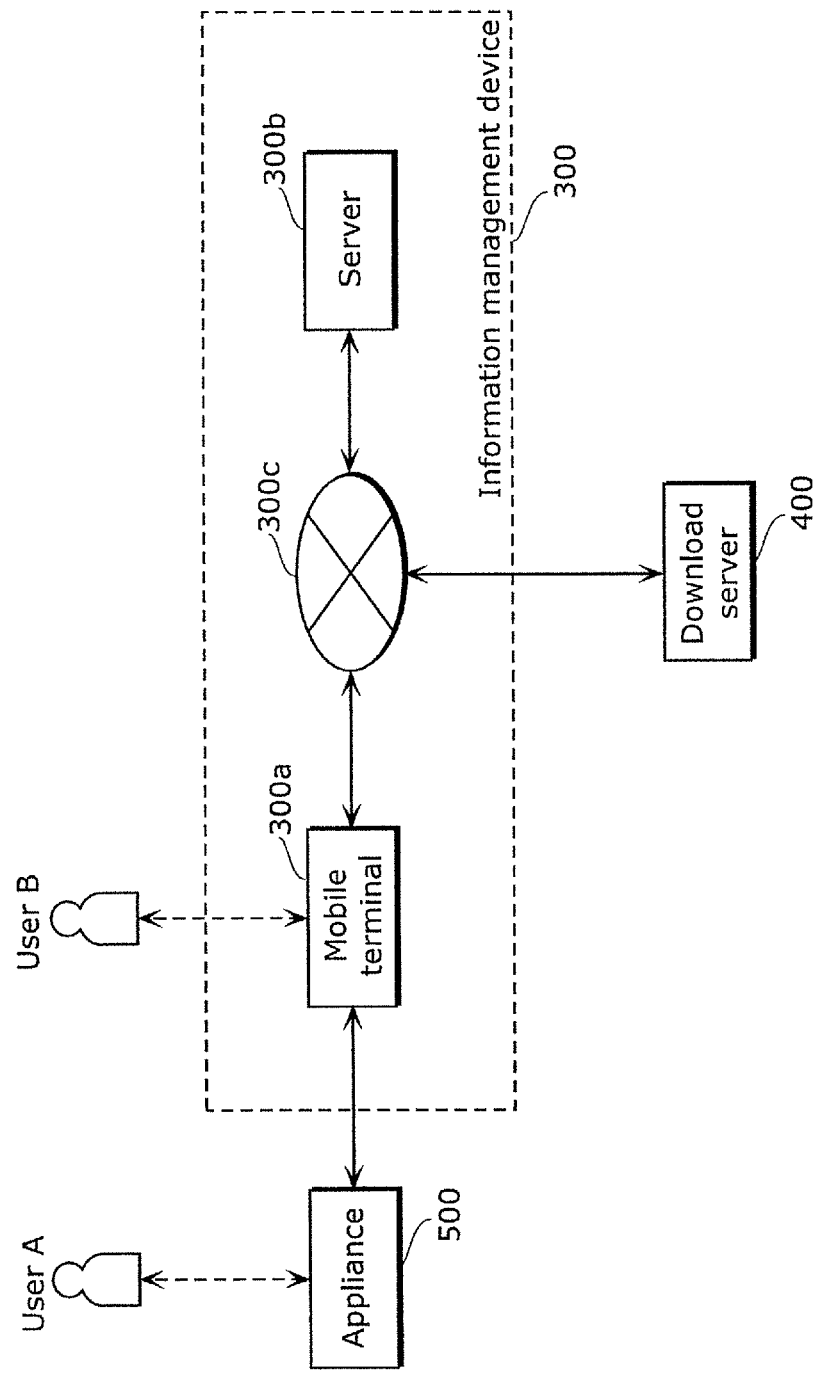
FIG. 9 is a diagram showing an example configuration of a system which includes an information management device according to an embodiment 3.

FIG. 9 is a diagram showing an example configuration of a system which includes the information management device according to the present embodiment.

The system includes an information management device 300, a download server 400, and an appliance (apparatus) 500.

The appliance 500 is configured as, for example, a body composition analyzer, and includes a plurality of the slots (storage areas) described above. According to the usage of the slots, the slots each store, for example, a user ID of a user of the slot, user information indicating a characteristic of the user or information (e.g., measurement information) obtained from the user by the appliance 500.

The appliance 500 communicates with the information management device 300 through short-range radio communication, such as near field communication (NFC), for example. It should be noted that the communications between the appliance 500 and the information management device 300 may be, as with the embodiment 2, any means insofar as data can be communicated, such as wired communication, communications using an IC chip and IC reader/writer, or wireless communication, such as infrared, Wi-Fi, or Bluetooth (registered trademark).

The download server 400 provides the information management device 300 with an application program for operating the appliance 500.

The information management device 300 includes a server 300b and a mobile terminal 300a. The mobile terminal 300a is connectable to the server 300b via a communication network 300c such as the Internet. The mobile terminal 300a is configured as, for example, a smartphone (an intelligent mobile phone), and obtains the application program described above from the download server 400 via the communication network 300c. The mobile terminal 300a executes the application program to communicate with the appliance 500 to operate or control the appliance 500.

Here, to use a slot in the appliance 500, a user of the slot is registered. In other words, the user ID or the user information described above is stored in the slot, thereby registering the user identified by the user ID or the user information as a user of the slot. For example, the user information includes the user's age, gender, or height, and the measurement information described above includes weight. If such user information and measurement information are stored in the slot, the appliance 500 can use such information to present, for example, basal metabolism or body mass index (BMI) to the user of the slot.

The registration described above includes a first registration mode in which the operator makes the registration done directly to the appliance 500, and a second registration mode in which the operator makes the registration done indirectly to the appliance 500 via the information management device 300.

In the first registration mode, as shown in FIG. 9, a user A, who is the operator, operates the appliance 500 to directly store (set) the user information into the slot in the appliance 500. As a result, the user A is registered as a user of the slot.

In the second registration mode, as shown in FIG. 9, a user B, who is the operator, operates the mobile terminal 300a to store (set) the user ID and the user information of the user B into the slot in the appliance 500. As a result, the user B is registered as a user of the slot. Specifically, the mobile terminal 300a obtains the user ID and the user information of the user B, who is the operator, and obtains from the appliance 500 information including a user ID or user information stored in each slot in the appliance 500 as user configuration information. The mobile terminal 300a displays images corresponding to the respective slots, in response to the information obtained from the appliance 500. In other words, the mobile terminal 300a displays an image, for each slot, which indicates details of the relationship between the slot and the operator. Displaying such images allows the user B, who is the operator, to properly judge whether the user B is already registered as a user of any of the slots or whether another user is registered to a slot, for example. Then, a slot of the slots is selected by the user B, and the mobile terminal 300a stores the user ID and the user information, which are previously obtained from the user B, into that slot.

Figure 10:
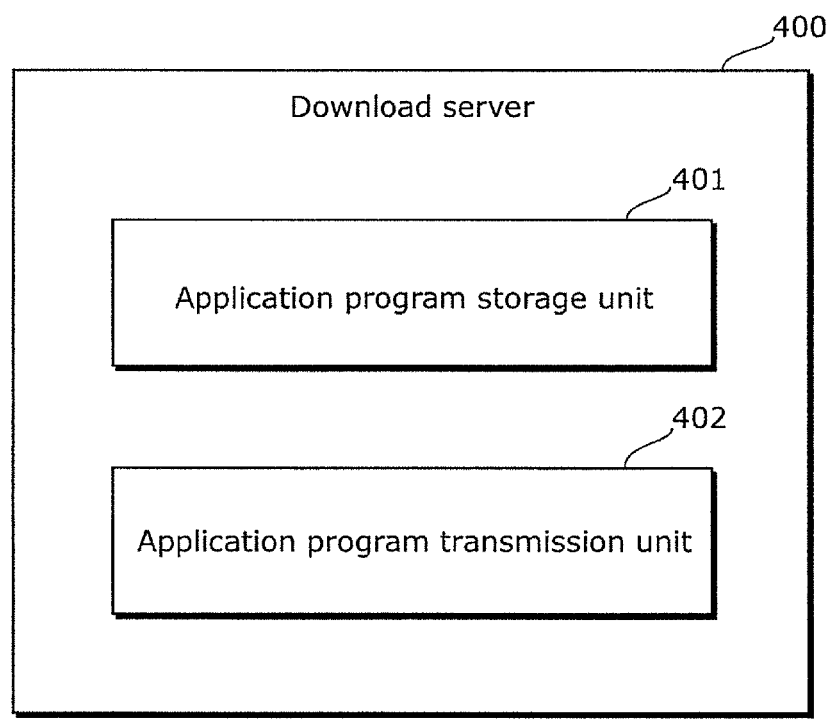
FIG. 10 is a diagram showing an example configuration of a download server according to the embodiment 3.

FIG. 10 is a diagram showing an example configuration of the download server 400 according to the present embodiment.

The download server 400 includes an application program storage unit 401 and an application program transmission unit 402. The application program storage unit 401 stores the application program for operating the appliance 500, for example. The application program transmission unit 402 reads the application program stored in the application program storage unit 401 and transmits the application program to the mobile terminal 300a via the communication network 300c. If the application program stored in the application program storage unit 401 is updated, the application program transmission unit 402 transmits the updated application program to the mobile terminal 300a.

Figure 11:
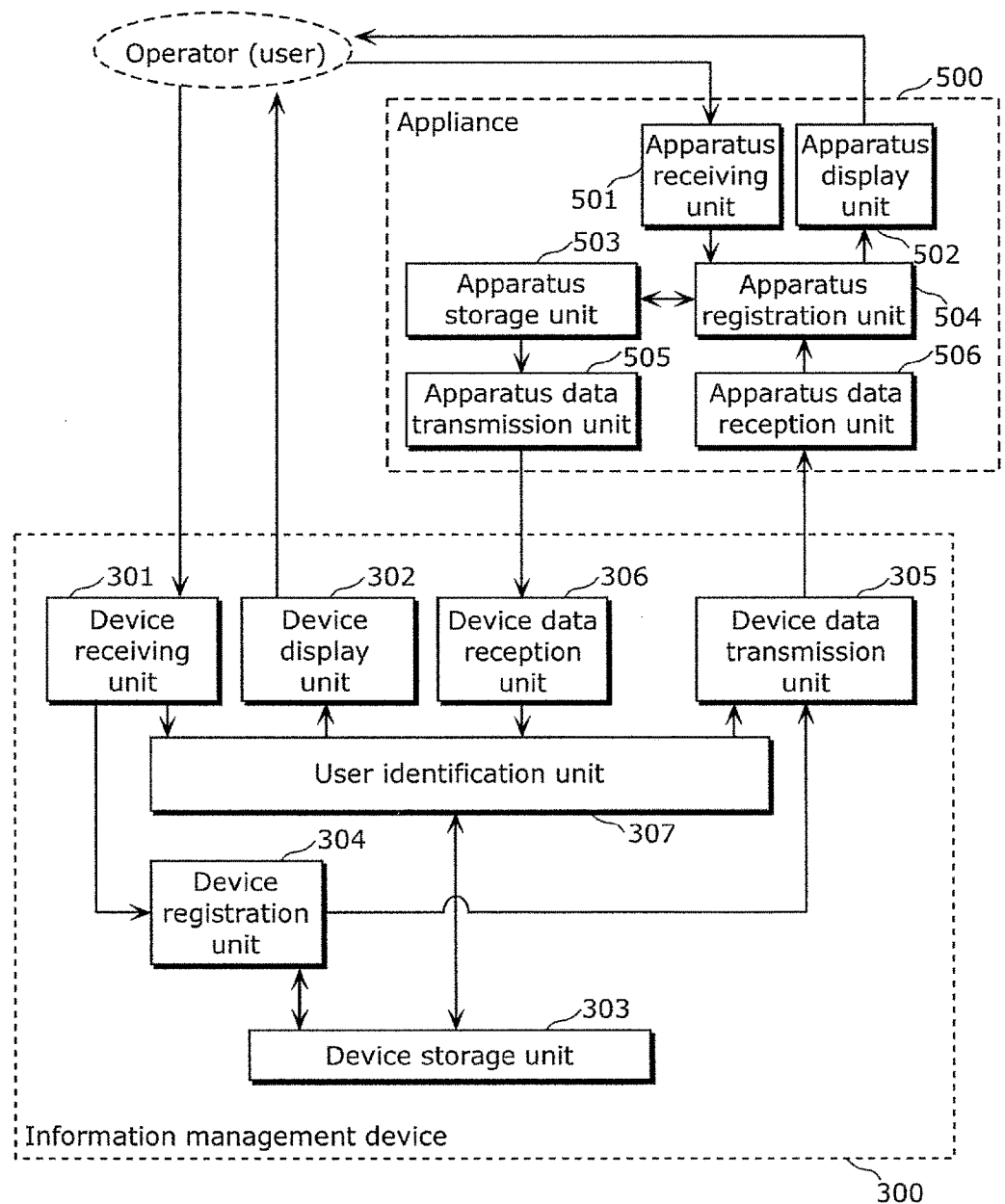
FIG. 11 is a block diagram showing an example configuration of the information management device and an appliance according to the embodiment 3.

FIG. 11 is a block diagram showing an example configuration of the information management device 300 and the appliance 500 according to the present embodiment.

The appliance 500 includes an apparatus receiving unit 501, an apparatus display unit 502, an apparatus storage unit 503, an apparatus registration unit 504, an apparatus data transmission unit 505, and an apparatus data reception unit 506.

The apparatus receiving unit 501 receives information (input information) input by the operator (user) and notifies the apparatus registration unit 504 of the received input information.

The apparatus display unit 502 includes, for example, a liquid crystal display, and displays, under control of the apparatus registration unit 504, images that are, for example, based on various pieces of information stored in the slots on the liquid crystal display.

The apparatus storage unit 503 includes, for example, a recording medium such as a hard disk or a nonvolatile memory, and has slots which are the storage areas described above.

The apparatus data reception unit 506 obtains the input information from the information management device 300, and outputs the input information to the apparatus registration unit 504.

After obtained the input information from the apparatus receiving unit 501, the apparatus registration unit 504 stores the input information into one of the slots in the apparatus storage unit 503. This makes the registration done according to the first registration mode described above. Also, the apparatus registration unit 504, after obtained the input information from the information management device 300 via the apparatus data reception unit 506, stores the input information into any one of the slots in the apparatus storage unit 503. This makes the registration done according to the second registration mode described above.

Furthermore, if another component included in the appliance 500 obtains the measurement information of the operator, the apparatus registration unit 504 stores the measurement information into the slot of the operator. In other words, in the case where the appliance 500 is configured as a body composition analyzer, weight of the operator is measured. The apparatus registration unit 504 stores the measurement information indicative of the weight into the slot.

The apparatus data transmission unit 505 transmits information stored in each slot in the apparatus storage unit 503 to the information management device 300.

The information management device 300 includes a device receiving unit 301, a device display unit 302, a device storage unit 303, a device registration unit 304, a device data transmission unit 305, a device data reception unit 306, and a user identification unit 307. It should be noted that among these components, the device receiving unit 301, the device display unit 302, the device data transmission unit 305, and the device data reception unit 306 are included in the mobile terminal 300a, for example. The device storage unit 303, the device registration unit 304, or the user identification unit 307 may be included in the server 300b or in the mobile terminal 300a.

The device receiving unit 301 receives information (the input information) input by the operator (user), and notifies at least one of the device registration unit 304 and the user identification unit 307 of the received input information.

The device display unit 302 includes, for example, a liquid crystal display, and displays, under control of the user identification unit 307, images that are, for example, based on various pieces of information stored in the slots on the liquid crystal display.

The device storage unit 303 includes, for example, a recording medium such as a nonvolatile memory. It should be noted that, if the device storage unit 303 is included in the server 300b, information transmission and reception are carried out between the device storage unit 303, the device registration unit 304, and the user identification unit 307 via the communication network 300c mentioned above. The device storage unit 303 stores a user ID and user information for each user, for example. Similarly, in the case where the device registration unit 304 and the user identification unit 307 are included in the server 300b, the components included in the mobile terminal 300 transmit information to or receive information from the device registration unit 304 and the user identification unit 307 via the communication network 300c mentioned above.

The device data transmission unit 305 obtains the information output from the user identification unit 307 and the device registration unit 304, and transmits it as the input information to the apparatus data reception unit 506 of the appliance 500.

The device data reception unit 306 receives the information transmitted from the apparatus data transmission unit 505 of the appliance 500 and outputs it to the user identification unit 307.

The device registration unit 304 performs processing according to the input information notified of by the device receiving unit 301.

The user identification unit 307 performs predetermined processing, based on the information output from at least one of the device receiving unit 301 and the device data reception unit 306. Then, the user identification unit 307 displays on the device display unit 302 information indicating a result of the processing in image, or causes the device data transmission unit 305 to transmit the information to the appliance 500, for example.

Here, the registrations which are done in accordance with the first registration mode and the second registration mode will be described in detail.

In the first registration mode, the apparatus receiving unit 501 of the appliance 500 receives a slot number. After the slot number is received, the apparatus registration unit 504 displays on the apparatus display unit 502 a message prompting for input of the user information. After the apparatus receiving unit 501 receives the user information as the input information described above as such, the apparatus registration unit 504 stores the user information as the user configuration information into a slot that has the received slot number. This registers (sets), as a user of the slot, a user identified by the user information to the slot that has the received slot number.

In the second registration mode, the device receiving unit 301 of the information management device 300 receives from the operator an operation prompting for a registration to the appliance 500. After the operation prompting for the registration is received, the user identification unit 307 displays on the device display unit 302 a message prompting the operator to input a user ID.

The device receiving unit 301 receives, as the input information, the user ID designated by the operator (a designated user ID). After the user ID is received, the user identification unit 307 obtains user information that is associated with that user ID and stored in the device storage unit 303. Furthermore, the user identification unit 307 obtains user configuration information in each slot from the apparatus storage unit 503 via the apparatus data transmission unit 505 and the device data reception unit 306. The user identification unit 307 then generates an image corresponding to each slot, based on the user ID, the user information, and the user configuration information, and displays a registration screen which includes the generated images on the device display unit 302. The operator selects one of the images from the registration screen displayed in such a way, and then the device receiving unit 301 receives a slot number of a slot corresponding to the selected image. After the slot number is received, the user identification unit 307 causes the device display unit 302 to display a message prompting the operator to input user information. If the user information is input, the device registration unit 304 stores the slot number, the user ID previously received, and the input user information as user configuration information into the device storage unit 303, and transmits the slot number, the user ID, and the user information to the apparatus registration unit 504 via the device data transmission unit 305 and the apparatus data reception unit 506. If the user information is not input, the device registration unit 304 transmits, to the apparatus registration unit 504 via the device data transmission unit 305 and the apparatus data reception unit 506, the slot number, the user ID previously received, and user information stored in association with the user ID in the device storage unit 303. The apparatus registration unit 504 stores the user ID and the user information as the user configuration information into the slot that has the transmitted slot number.

Figure 12A:
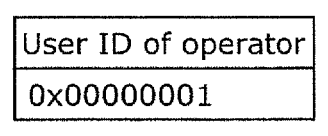

FIG. 12A is a diagram showing an example of the user ID.

The operator operates, for example, the mobile terminal 300a to input (designate) a user ID, "0x00000001," of the operator to the mobile terminal 300a, as shown in FIG. 12A. The device receiving unit 301 of the information management device 300 receives the user ID input as such, as a designated user ID. It should be noted that the device receiving unit 301 may receive a character through operation by the operator, and convert the character into the user ID mentioned above. The device receiving unit 301 may also use a login ID for the application program described above as the user ID, for example.

FIG. 12B is a diagram showing an example of the information stored in the apparatus storage unit 503 of the appliance 500.

The apparatus storage unit 503 has a plurality of slots which are storage areas distinguished by its slot number. According to the usage of each slot, the slot stores at least one of a slot state, the user ID, the user information, and user history information. It should be noted that the user configuration information, which is information on a user of the slot mentioned above, is information stored in the slot, except for the user history information. In other words, the user configuration information is information including all the slot state, the user ID, and the user information, if stored in the slot.

The user ID is information for distinguishing or identifying a user of a slot, indicating "0x00000001," for example. The user information is information indicating a characteristic of a user of the user ID in the slot, indicating the user's age and height, for example. For example, the user information indicates age "38" and height "175 cm."

The user history information includes the user information previously obtained by the appliance 500. In the case where the appliance 500 is a body composition analyzer, the user history information includes, as measurement information, the user's weight previously measured and date and time of the measurement (e.g., Date "Jun. 13, 2013" and Weight "70.3 kg"). Additionally, a room temperature, for example, may be included in the user history information. Each time a measurement is made, the latest measurement information is added to the user history information.

The slot state is information indicating a state of the slot, such as, "User ID registered," "User ID unregistered," and "Empty." In other words, the slot state of a slot having a user ID stored therein indicates "User ID registered." The slot state of a slot not having the user ID but the user information and the user history information stored therein indicates "User ID unregistered." The slot state of a slot not having the user ID, the user information, or the user history information stored therein indicates "Empty."

It should be noted that the slot storing the slot state indicating "User ID registered" is a slot to which a user ID is registered in accordance with the second registration mode described above, that is, a slot to which a user ID is registered through the information management device 300.

On the other hand, the slot storing the slot state indicating "User ID unregistered" is a slot to which a user ID is registered in accordance with the first registration mode described above, that is, a slot to which a user ID is directly registered in the appliance 500.

Such information stored in the apparatus storage unit 503 is generated by the apparatus registration unit 504. In other words, the apparatus registration unit 504 stores the user ID and the user information obtained from the information management device 300 via the apparatus data reception unit 506 into the slot having the slot number obtained from the information management device 300 via the apparatus data reception unit 506. The apparatus registration unit 504 also stores the user information received by the apparatus receiving unit 501 into the slot having the slot number received by the apparatus receiving unit 501. Furthermore, if the measurement information is obtained through the measurement, the apparatus registration unit 504 stores the measurement information into the slot, as part of the user history information. Then, the apparatus registration unit 504 checks storage states of the user ID, the user information, and the user history information in each slot, and stores the slot state of each slot based on a result of the checking.

It should be noted that the slot state may not be included in the user configuration information. In this case, the user configuration information that includes the user ID indicates "User ID registered" mentioned above. The user configuration information that includes only the user information, without the user ID, indicates "User ID unregistered" mentioned above. The user configuration information that does not include the user ID and user information indicates "Empty" mentioned above.

Figures 12C, 13:
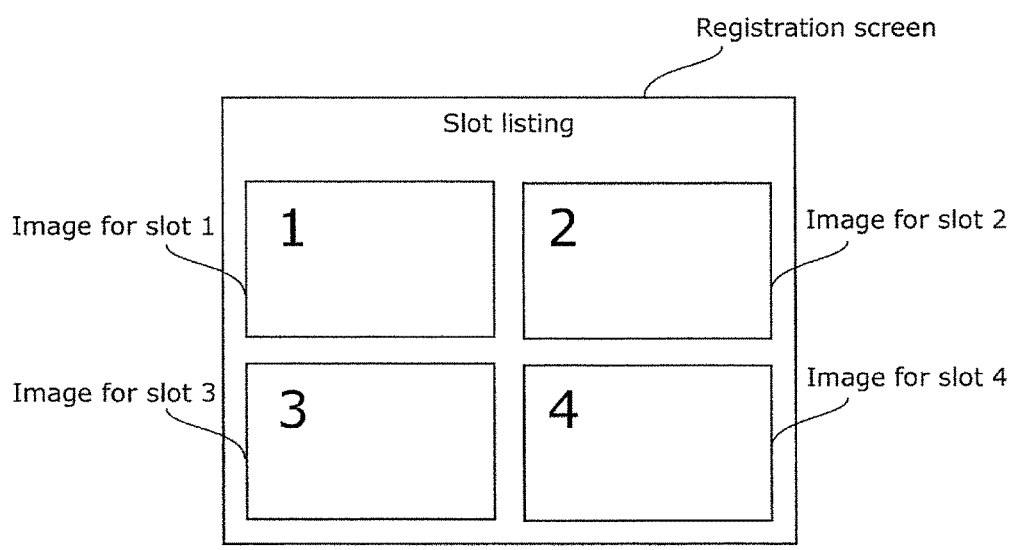
FIG. 12C is a diagram showing an example of information stored in a device storage unit of the information management device according to the embodiment 3.
FIG. 13 is a diagram showing an example of a registration screen displayed on a device display unit according to the embodiment 3.

FIG. 12C is a diagram showing an example of the information stored in the device storage unit 303 of the information management device 300.

The device storage unit 303 holds, for each user, a user ID for identifying the user, the user information of the user, and the user history information of the user.

Such information to be stored in the device storage unit 303 is generated by the device registration unit 304 and the user identification unit 307. In other words, if the device receiving unit 301 receives a user ID and user information, the device registration unit 304 stores the user ID and the user information into the device storage unit 303. Moreover, if obtained a user ID and measurement information of a predetermined user from the apparatus storage unit 503 of the appliance 500 via the apparatus data transmission unit 505 and the device data reception unit 306, the user identification unit 307 stores the measurement information in association with the user ID into the device storage unit 303, as part of the user history information.

FIG. 13 is a diagram showing an example of the registration screen displayed on the device display unit 302.

The user identification unit 307 generates images corresponding to respective slots, based on the user ID of the operator received by the device receiving unit 301, the user information of the operator identified by the user ID, and the user configuration information in each slot obtained from the appliance 500. Then, the user identification unit 307 displays a registration screen which includes these images on the device display unit 302, as shown in FIG. 13.

Here, in generating the images corresponding to the slots, the user identification unit 307 generates, for each slot, an image that has a background color from which whether the slot is being used and a relationship between the operator and a user of the slot can be known.

Specifically, the user identification unit 307 determines whether the user ID (designated user ID) of the operator received by the device receiving unit 301 and a user ID included in user configuration information in the slot match. If determined that the designated user ID and the user ID included in the user configuration information match, the user identification unit 307 concludes that the slot is being used for the operator. Accordingly, the user identification unit 307 generates an image having the background color indicating "Operator (concluded)" for that slot, as a result of the conclusion.

If determined the designated user ID and the user ID included in the user configuration information do not match, the user identification unit 307 concludes that the slot is being used for a user other than the operator. Accordingly, the user identification unit 307 generates an image having a background color indicating "Non operator (concluded)" for that slot, as a result of the conclusion.

If the user configuration information in the slot does not include a user ID, the user identification unit 307 determines whether the user information of the operator identified by the designated user ID and the user information included in the user configuration information nearly match. It should be noted that the user identification unit 307 performs the above determination, using the user information stored in association with the designated user ID in the device storage unit 303 as the user information of the operator identified by the designated user ID, as shown in FIG. 12C. If determined that the user information of the operator identified by the designated user ID and the user information included in the user configuration information nearly match, the user identification unit 307 estimates that the slot is being used for the operator. Accordingly, the user identification unit 307 generates an image having a background color indicating "Operator (estimated)" for that slot, as a result of the estimation.

If determined that the user information of the operator identified by the designated user ID and the user information included in the user configuration information do not nearly match, the user identification unit 307 estimates that the slot is being used for a user other than the operator. Accordingly, the user identification unit 307 generates an image having a background color indicating "Non operator (estimated)" for that slot, as a result of the estimation.

If the user configuration information does not include a user ID and user information, namely, if the slot state included in the user configuration information indicates "Empty," the user identification unit 307 concludes that the slot is not being used for any user. Accordingly, the user identification unit 307 generates an image having a background color indicating "Empty" for that slot, as a result of the conclusion.

It should be noted that in the registration screen shown in FIG. 13, the background colors of the images corresponding to all the slots 1 to 4 indicate "Empty." Thus, the operator who sees the registration screen can readily judge that the operator can register his/her information to any slot.

Figure 14:
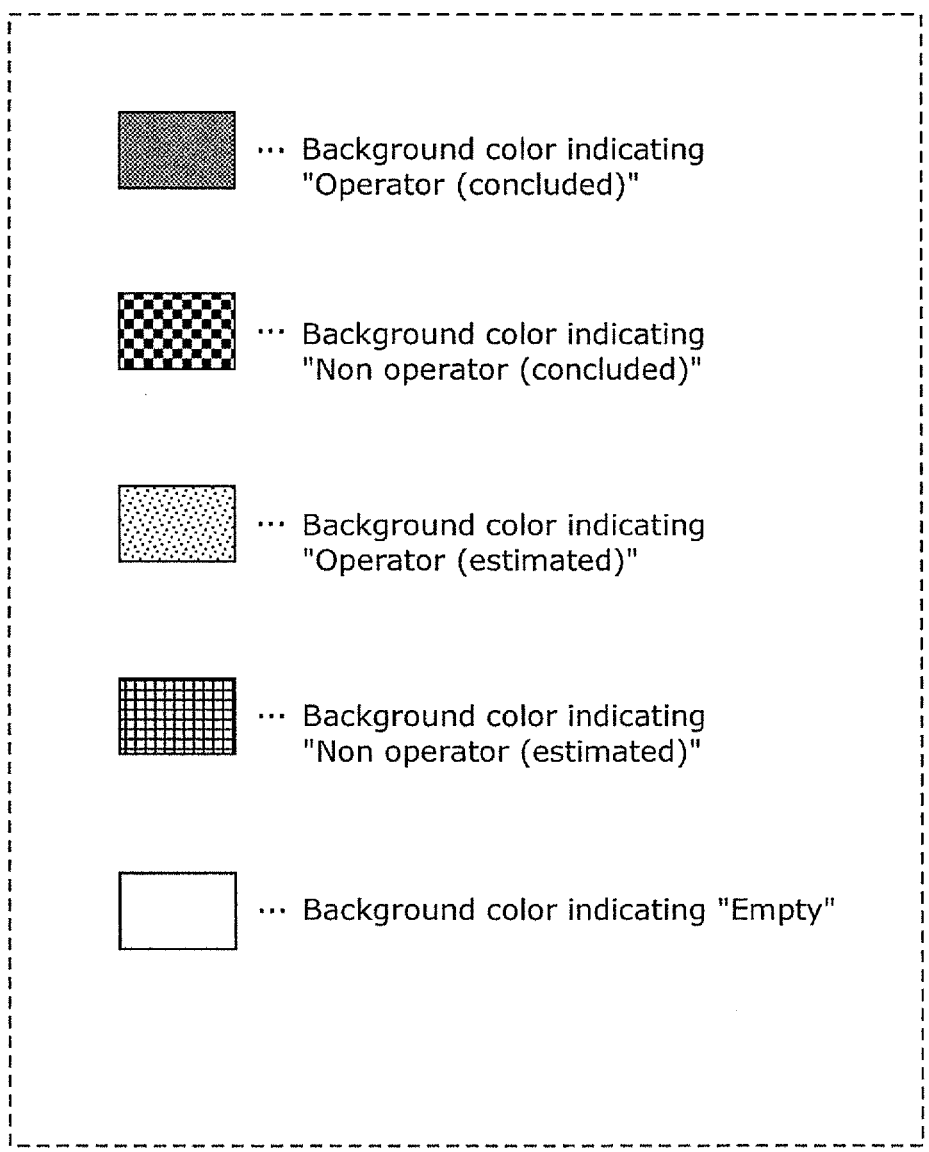
FIG. 14 is a diagram showing an example of background colors of images generated for respective slots in the embodiment 3.

FIG. 14 is a diagram showing an example of the background colors of the images generated for respective slots.

The user identification unit 307 generates an image having, for example, a uniformly dark background color as the image having the background color indicating "Operator (concluded)" as shown in FIG. 14. The user identification unit 307 also generates an image having, for example, a checkered background color as the image having the background color indicating "Non operator (concluded)." Moreover, the user identification unit 307 generates an image having, for example, a uniformly light background color as an image having the background color indicating "Operator (estimated)." Additionally, the user identification unit 307 generates an image having, for example, a cross-hatched background color as an image having the background color indicating "Non operator (estimated)." Furthermore, the user identification unit 307 generates an image having, for example, a white background color as an image having the background color indicating "Empty."

Figure 15:
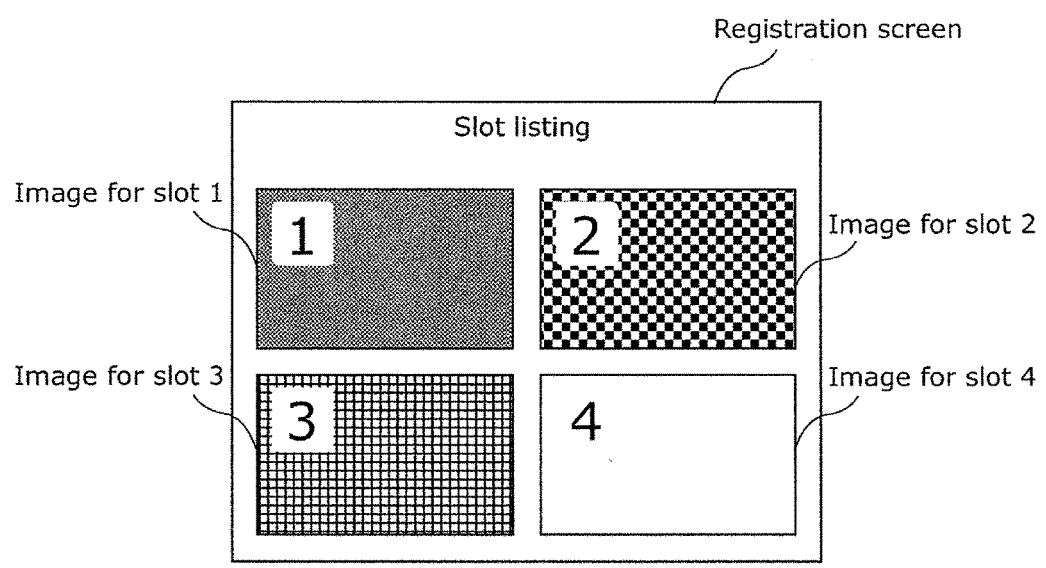
FIG. 15 is a diagram showing an example of the registration screen displayed on the device display unit according to the embodiment 3.

FIG. 15 is a diagram showing an example of the registration screen displayed on the device display unit 302.

The user identification unit 307 displays the registration screen which includes the images corresponding to the respective slots 1 to 4 on the device display unit 302. Here, the user identification unit 307 displays the image having the background color indicating "Operator (concluded)" as the image corresponding to the slot 1, displays the image having the background color indicating "Non operator (concluded)" as the image corresponding to the slot 2, displays the image having the background color indicating "Non operator (estimated)" as the image corresponding to the slot 3, and displays the image having the background color indicating "Empty" as the image corresponding to the slot 4, as shown in FIG. 15, for example.

Therefore, the operator who sees the registration screen can readily judge that the operator is registered as a user of the slot 1 and thus need not make a registration again.

Figure 16:
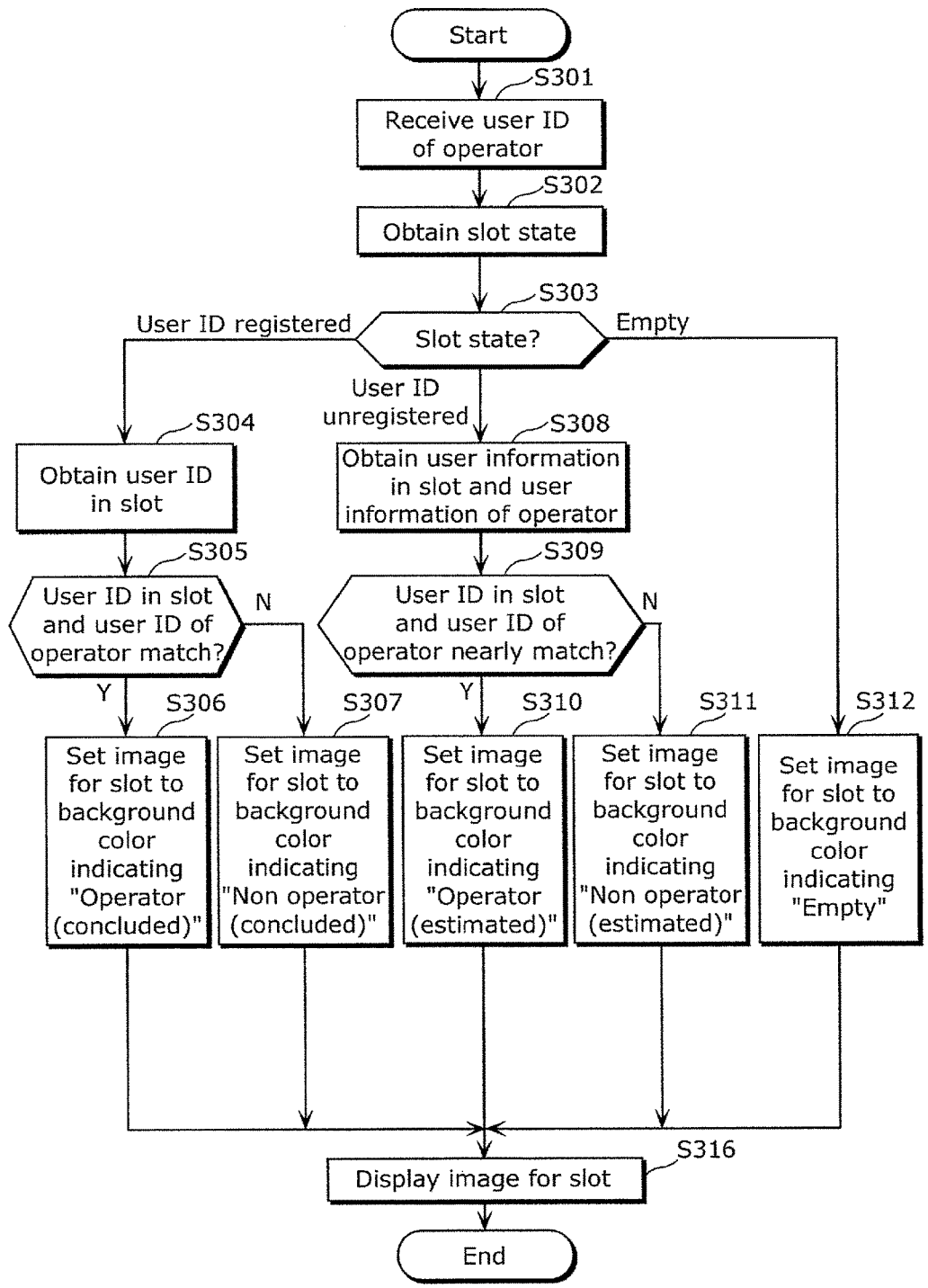
FIG. 16 is a flowchart illustrating processing operation of the information management device according to the embodiment 3.

FIG. 16 is a flowchart illustrating processing operation of the information management device 300.

The information management device 300 receives the user ID (the designated user ID) of the operator (step S301), shown in FIG. 12A, for example. Furthermore, the information management device 300 obtains from the appliance 500 the slot state of each slot, and the slot state included in the user configuration information (step S302), shown in FIG. 12B, for example. Next, the information management device 300 determines whether the slot state for each slot indicates one of "User ID registered," "User ID unregistered," and "Empty" (step S303). Here, if determined that if any of the slot states indicates "User ID registered," the information management device 300 obtains from the appliance 500 a user ID corresponding to the slot state included in the user configuration information shown in FIG. 12B, namely, the user ID in the slot (step S304). Then, the information management device 300 determines whether the user ID of the operator and the user ID in that slot match (step S305).

Here, if determined that the user ID of the operator and the user ID in the slot match (Y in step S305), the information management device 300 sets a background color of the image for that slot to the background color indicating "Operator (concluded)" (step S306). This generates an image that has the background color indicating "Operator (concluded)." On the other hand, if determined that the user ID of the operator and the user ID in the slot do not match (N in step S305), the information management device 300 sets the background color of the image for that slot to the background color indicating "Non operator (concluded)" (step S307). This generates an image that has the background color indicating "Non operator (concluded)."

If determined in step S303 that any of slot states indicates "User ID unregistered," the information management device 300 obtains from the appliance 500 user information (the user information in the slot) corresponding to the slot state indicating "User ID unregistered" and included in the user configuration information shown in FIG. 12B, and obtains from the device storage unit 303 the user information (the user information of the operator) associated with the user ID of the operator (step S308), as shown in FIG. 12C, for example. Then, the information management device 300 determines whether the user information of the operator and the user information in the slot nearly match (step S309). It should be noted that the user information of the operator and the user information in the slots each indicate characteristic figures, such as user's age or height. The user information of the operator and the user information in the slot are determined to nearly match if a difference between characteristic figures indicated by the user information of the operator and the user information in the slot falls within a predetermine range.

Here, if determined that the user information of the operator and the user information in the slot nearly match (Y in step S309), the information management device 300 sets a background color of the image for that slot to the background color indicating "Operator (estimated)" (step S310). This generates an image that has the background color indicating "Operator (estimated)." On the other hand, if determined that the user information of the operator and the user information in the slot do not nearly match (N in step S309), the information management device 300 sets the background color of the image for that slot to the background color indicating "Non operator (estimated)" (step S311). This generates an image that has the background color indicating "Non operator (estimated)."

Moreover, if determined in step S303 that any of slot states indicates "Empty," the information management device 300 sets the background color of the image for that slot to the background color indicating "Empty" (step S312).

Then, after images are generated by the processes of steps S306, S307, and S310 to S312, the information management device 300 displays a registration screen which includes the images of the plurality of slots (step S316), as shown in FIG. 13 or 15, for example.

As described above, in the present embodiment, images associated with slots are each displayed in a mode in accordance with the relationship between a user identified by the user configuration information stored in the slot and the operator identified by the user ID (the designated user ID) or the user information. Thus, the operator can visually and readily be aware of whether the slots are being used for other users or a slot is already being used for the operator. Additionally, the operator can visually and readily be aware of a slot not being used for any user. In other words, the usage of each of the slots can be presented in a visually intuitive manner.

Moreover, an image (a fourth image) that has the background color indicating "Operator (concluded)" is displayed as a first image for the slot that stores the user ID which matches the designated user ID of the operator. Thus, the operator can readily find a slot concluded being used for the operator. Moreover, even if the slot does not have the user ID stored therein, an image (a fifth image) that has the background color indicating "Operator (estimated)" is displayed as the first image for the slot if the slot stores the user configuration information indicating a characteristic that nearly matches the operator's characteristic indicated by the user information. Thus, the operator can readily find a slot estimated being used for the operator.

Here, the image (the fourth image) associated with the slot that stores the user ID which matches the designated user ID of the operator and the image (the fifth image) associated with the slot that stores the user configuration information indicating the characteristic that nearly matches the operator's characteristic indicated by the user information are displayed in visually distinguishable modes. Thus, the operator can readily be aware of whether the slot is concluded being used for the operator or the slot is estimated being used for the operator.

Moreover, an image (the sixth image) having the background color indicating "Non operator (concluded)" is displayed as the second image for the slot that stores the user ID which does not match the designated user ID of the operator. Thus, the operator can readily find the slot concluded being used for another user. Even if the slot does not have user IDs stored therein, an image (the seventh image) having the background color indicating "Non operator (estimated)" is displayed as the second image for the slot if the slot stores user configuration information indicating a characteristic that does not nearly match the operator's characteristic indicated by the user information. Thus, the operator can readily find a slot estimated being used for another user.

Here, the sixth image associated with the slot that stores the user ID which does not match the designated user ID of the operator and the seventh image that is associated with the slot which stores the user configuration information indicating the characteristic that does not nearly match the operator's characteristic indicated by the user information are displayed in visually distinguishable modes. Thus, the operator can readily be aware of whether the slot is concluded being used for another user or the slot is estimated being used for another user.

Thus, the information management device 300 according to the present embodiment displays the images corresponding to the slots as described above, thereby allowing the operator to select an appropriate slot from among the slots and make a registration done. Even if a user ID is not included in the user configuration information in the appliance 500, an appropriate image is displayed, depending on the user information. Thus, as a result of a direct registration of the user ID to the appliance 500, namely, the registration in the first registration mode mentioned above, the usage of each slot can be properly displayed even if a user ID is not in the user configuration information in the appliance 500.

(Variation of Embodiment 3)

An information management device 300 according to a variation of the embodiment 3 has a feature of displaying not only images corresponding to slots but also priority information indicative of a priority level of each slot.

Here, a priority level of a slot is based on a level of importance of information stored in the slot. The priority information indicative of the priority level of the slot is, in other words, information indicating the level of importance of the information stored in the slot. A slot which stores information that is of high importance has a high priority level. A slot which stores information that is of low importance has a low priority level. An unused slot may be regarded as storing information of even lower importance.

Figure 17:
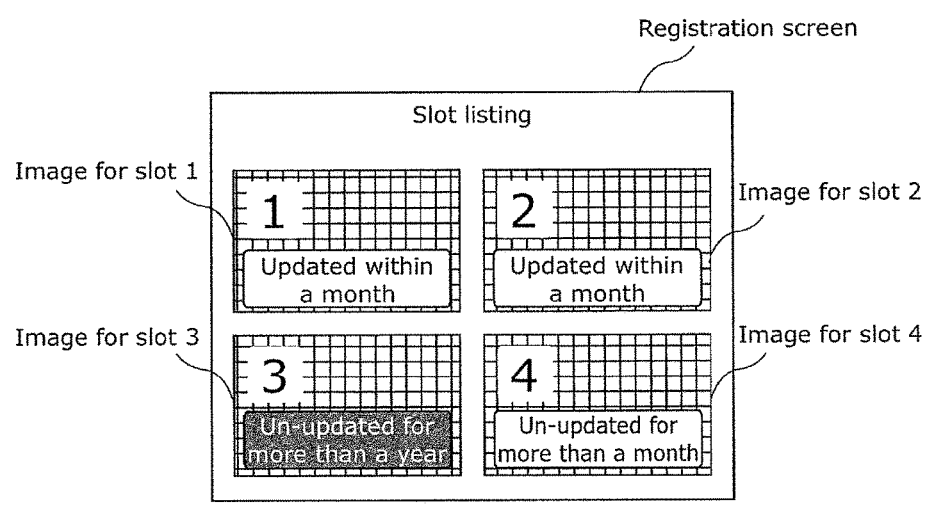
FIG. 17 is a diagram showing an example of a registration screen displayed on a device display unit according to a variation of the embodiment 3.

FIG. 17 is a diagram showing an example of a registration screen displayed on a device display unit 302 according to the variation of the embodiment 3.

The information management device 300 according to the variation of the embodiment 3, as shown in FIG. 17, displays an update status of each slot on the device display unit 302, as the priority information, for example.

The update status indicates a status of update of user history information stored in a slot, such as whether the user history information is updated within a given period of time (e.g., showing "Un-updated for more than a year"). Here, the shorter the period where the user history information is not updated, the higher importance the user history information is of, and the longer the period where the user history information is not updated, the lower importance the user history information is of.

In this case, the longer the period where the user history information stored in the slot, the lower priority level the slot has. Thus, such priority information according to an update status is displayed, thereby allowing the operator to properly judge which slot has a low priority level, even if images having a background color indicating "Non operator (estimated)" are displayed for all the slots, for example. In other words, the operator can readily judge a slot which stores a user ID and user information to be overwritten.

FIG. 18 is a flowchart illustrating processing operation of the information management device 300 according to the variation of the embodiment 3.

The information management device 300 according to the variation of the embodiment 3 performs the processes of steps S301 to S312 illustrated in FIG. 16 according to the embodiment 3. After step S307, S310 or S311 is performed, the information management device 300 according to the variation of the embodiment 3 obtains measurement history in a slot (step S313). The measurement history in a slot includes date and time that are included in the latest measurement information in the user history information shown in FIG. 12B. In other words, the user identification unit 307 of the information management device 300 obtains the date and time included in the latest measurement information mentioned above as the measurement history from the apparatus storage unit 503 of the appliance 500 via the apparatus data transmission unit 505 and the device data reception unit 306. Next, the user identification unit 307 of the information management device 300 determines a priority level of the slot, based on the measurement history (step S314). Furthermore, in step S307, S310 or S311, the user identification unit 307 superimposes the priority information indicative of the priority level of the slot on the image generated for that slot (step S315). Then, the user identification unit 307 displays, for each slot, an image having the priority information of the slot superimposed thereon on the device display unit 302 (step S316).

As described above, according to the variation of the embodiment 3, the images associated with the plurality of slots and the priority information of the plurality of slots are displayed, thereby allowing the operator to check the priority information that corresponds to each slot to readily find a usable slot among the plurality slots, even if there is no available slot, for example. For example, the operator can judge a slot that has a low priority level as being usable. Moreover, if the operator who sees such priority information selects a slot having a low priority level, a user ID and user information stored in that slot is overwritten with the user ID (the designated user ID) and the user information of the operator. In other words, a user ID and user information stored in a slot having a low priority level are deleted and the user ID and user information of the operator are stored as new user configuration information.

While in the variation of the embodiment 3, a priority level of an image generated in step S307, S310, or S311 is determined and the priority information indicative of the priority level is superimposed on the image, it should be noted that, similarly, a priority level of a slot that corresponds to an image generated in step S306 or S312 may also be determined and the priority information indicative of the priority level of that slot may be superimposed on the image.

The variation of the embodiment 1 or 2 may be applied also to the embodiment 3 or the variation thereof.

In other words, the information management method according to the embodiment 3 or the variation thereof may further include: displaying a screen for an inquiry as to whether to store the designated user ID or the user information if the operator selects, as a slot to which a registration is to be made, a slot which stores the user configuration information indicating the user ID that does not match the designated user ID of the operator; and receiving a response to the inquiry on the screen. Here, the designated user ID or the user information is stored as new user configuration information into the selected slot if the response to store the user information is received.

This displays, if the operator has accidentally selected a slot concluded being used for another user, a screen for an inquiry as to whether to store the designated user ID or the user information of the operator into the slot is displayed. This prevents the operator from overwriting, by mistake, the user configuration information of another user already stored, with the designated user ID of the operator, as new user configuration information.

Moreover, the information management method according to the embodiment 3 or the variation thereof may further include: obtaining a pin code stored in the selected slot to which the registration is to be made; and receiving a designated pin code. Here, if the designated pin code and the pin code stored in the selected slot match, the designated user ID or the user information of the operator is stored as new user configuration information into the selected slot.

According to this, the user ID or the user information of the operator is not stored as new user configuration information into a slot if the pin code stored in the slot and the designated pin code do not match, thus preventing false registration by the operator.

While the information management method according to one or more aspects of the present invention has been described with reference to the embodiments and the variations thereof, the present invention is not limited to the embodiments and the variations thereof. Various modifications to the embodiments and the variations thereof that may be conceived by those skilled in the art and combinations of the components of different embodiments are intended to be included within the scope of the one or more aspects of the present invention, without departing from the spirit of the present invention.

Figure 19A:
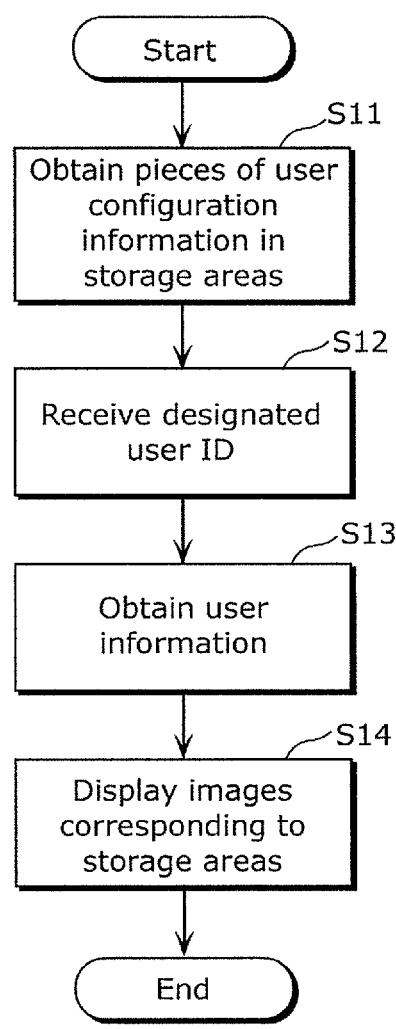
FIG. 19A is a flowchart illustrating an information management method according to an aspect of the present invention.

FIG. 19A is a flowchart illustrating the information management method according to an aspect of the present invention.

The information management method according to an aspect of the present invention is an information management method for managing storage areas, the method including: (S11) obtaining user configuration information stored in each of the storage areas from an apparatus including the storage areas, the user configuration information being information on a user stored in the storage area; (S12) receiving a designated user ID which is a user ID that has been designated; (S13) obtaining user information indicating a characteristic of a user identified by the designated user ID; and (S14) displaying images associated with the storage areas, based on the designated user ID, the user information, and the user configuration information stored in each of the storage areas. In step (S14), a first image is displayed for a storage area of the storage areas which stores user configuration information regarding the user identified by one of the designated user ID and the user information, a second image different from the first image is displayed for a storage area of the storage areas which stores user configuration information regarding another user different from the user identified by the one of the designated user ID and the user information, and a third image different from the first image and the second image is displayed for a storage area of the storage areas which stores user configuration information indicating that the storage area is not being used for any user.

Figure 19B:
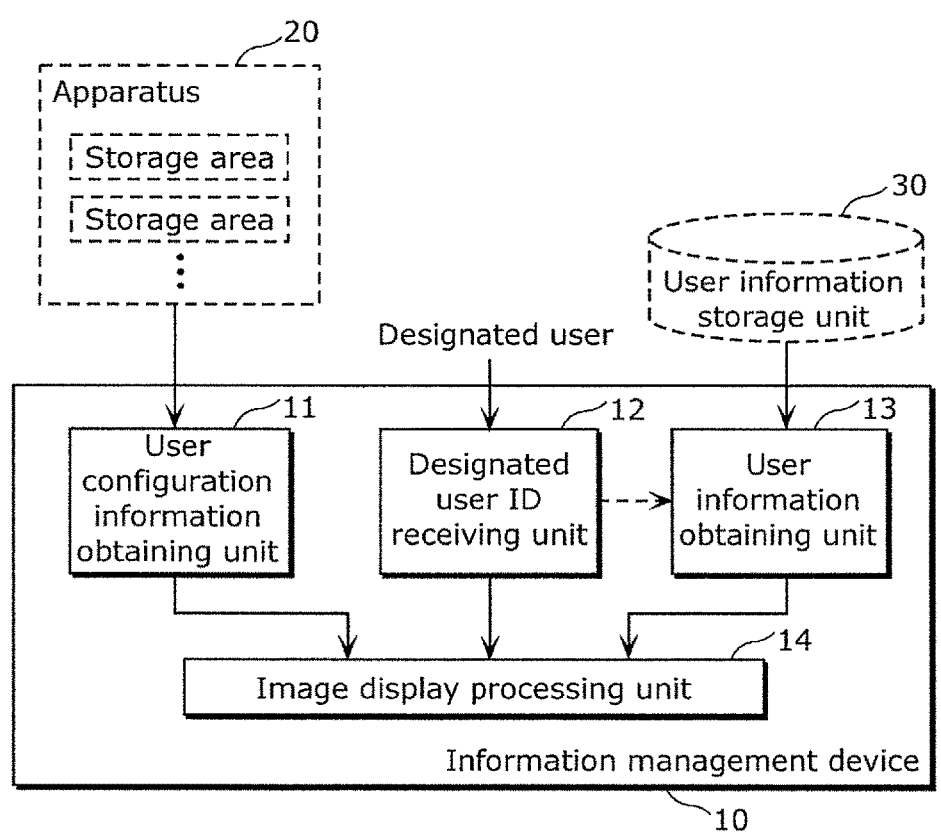
FIG. 19B is a block diagram of an information management device according to an aspect of the present invention.

FIG. 19B is a block diagram showing a configuration of an information management device according to an aspect of the present invention.

The information management device 10 according to an aspect of the present invention includes a user configuration information obtaining unit 11, a designated user ID receiving unit 12, a user information obtaining unit 13, and an image display processing unit 14. The user configuration information obtaining unit 11 obtains user configuration information stored in each of the storage areas from an apparatus 20 including the storage areas, the user configuration information being information on a user stored in the storage area. The designated user ID receiving unit 12 receives a designated user ID which is a user ID that has been designated. The user information obtaining unit 13 obtains user information indicating a characteristic of a user identified by the designated user ID from, for example, a user information storage unit 30. The image display processing unit 14 displays images associated with the storage areas, based on the designated user ID, the user information, and the user configuration information stored in each of the storage areas. Here, the image display processing unit 14: displays a first image for a storage area of the storage areas which stores user configuration information regarding the user identified by one of the designated user ID and the user information; displays a second image different from the first image for a storage area of the storage areas which stores user configuration information regarding another user different from the user identified by the one of the designated user ID and the user information; and displays a third image different from the first image and the second image for a storage area of the storage areas which stores user configuration information indicating that the storage area is not being used for any user.

In such an aspect, images associated with storage areas are each displayed in a mode in accordance with the relationship between a user identified by the user configuration information stored in the storage area and a user who is the operator identified by the designated user ID or the user information. Thus, the operator can visually and readily be aware of whether the storage areas are being used for other users or a storage area is already being used for the operator. Additionally, the operator can visually and readily be aware of a storage area not being used for any user. In other words, the usage of each of the storage areas can be presented in a visually intuitive manner.

It should be noted that each component in each embodiment may be configured with dedicated hardware or may be implemented by executing a software program suitable for the component. The component may be implemented by a program execution unit, such as a CPU or processor, loading and executing the software program stored in a recording medium such as a hard disk or a semiconductor memory. Here, the software program for implementing the information management device according to each of the embodiments described above is a program which causes a computer to execute the information management method illustrated in FIG. 19A.

Moreover, in the information management method according to the above-described embodiments and the variations thereof, the registration screen mentioned above is displayed when the operator is to make a registration.

However, the way the registration is made is not limited thereto and the registration screen shown in FIG. 13, 15, or 17 may be displayed at any other time. For example, the registration screen mentioned above may be displayed as a confirmation screen at a moment the operator is to check the usage of each slot.

Moreover, in the embodiments and the variations thereof, the information management device, after received the user ID (the designated user ID) designated by the operator, obtains the user information associated with the user ID from a storage unit or a server. However, if such user information is not already stored in association with the user ID in the storage unit or server, the information management device may receive user information designated by the operator, together with the user ID.

The following cases are also included in the scope of the present invention.

(1) Each device described above is, specifically, a computer system which includes a microprocessor, a ROM, a RAM, a hard disk unit, a display unit, a keyboard, a mouse, and so on. A computer program is stored in the RAM or the hard disk unit. By the microprocessor operating in accordance with the computer program, each device achieves its function. Here, the computer program is, to achieve predetermined functionality, a combination of a plurality of instruction codes indicating instructions to the computer.

(2) Part or the whole of the components included in each of the devices described above may be configured with one system LSI (Large Scale Integration). The system LSI is a super multi-function LSI manufactured by integrating a plurality of components on one chip, and is, specifically, a computer system which includes a microprocessor, a ROM, a RAM, and so on. A computer program is stored in the RAM. The system LSI achieves its functionality by the microprocessor performing operations in accordance with the computer program.

(3) Part or the whole of the components included in each of the devices described above may be configured with an IC card or a single module detachable to the device. The IC card or the module is a computer system which includes a microprocessor, a ROM, a RAM, and so on. The IC card or the module may include the super multi-function LSI described above. The IC card or the module performs its functionality by the microprocessor operating in accordance with the computer program. The IC card or the module may be of tamper-resistant.

(4) The present invention may be the methods described above. Moreover, the present invention may be a computer program implementing such methods via a computer, or may be a digital signal representing the computer program.

Moreover, the present invention may be a computer-readable recording medium having the computer program or the digital signals stored therein, such as a flexible disk, a hard disk, CD-ROM, MO, DVD, DVD-ROM, DVD-RAM, BD (Blu-ray (registered trademark) Disc), and a semiconductor memory. Moreover, the present invention may be the digital signal recorded in such a recording medium.

Moreover, the present invention may be achieved by transmitting the computer program or the digital signal via an electric communication line, a wireless or wired communication line, a network represented by the Internet, data broadcast, or the like.

Moreover, the present invention may be a computer system which includes a microprocessor and a memory, the memory may have the computer program stored therein, and the microprocessor may operate in accordance with the computer program.

Moreover, the program or the digital signal may be transferred in the recording medium, or the program or the digital signal may be transferred via the network or the like to be implemented in other independent computer system.

(5) The above-described embodiments and variations thereof may be combined.

INDUSTRIAL APPLICABILITY

An information management method according to the present invention is applicable to information management devices, including mobile terminals such as smartphones, which manage a plurality of storage areas of an apparatus such as a home appliance. For example, the information management method is useful in allowing a user to register user information to a home appliance which handles the user information. The information management method is applicable not only to a direct registration to a home appliance, but also to a remote registration with use of a communication terminal.

What is claimed is:

1. An information management method for managing storage areas of a weight scale which includes a display unit to display images, comprising:
   (a) obtaining user configuration information stored in each of the storage areas of the weight scale including the storage areas, the user configuration information being information on a user of the weight scale stored in the storage area;
   (b) receiving a designated user ID which is a user ID that has been designated;
   (c) obtaining user information indicating a characteristic of a user of the weight scale identified by the designated user ID; and
   (d) displaying images each associated with a corresponding one of the storage areas, based on the designated user ID, the user information, and the user configuration information stored in the corresponding one of the storage areas, the images comprising a first image, a second image, and a third image which are different from one another, wherein
   display of the first image by the display unit of the weight scale to the user of the weight scale indicates to the user of the weight scale that a storage area corresponding to the first image among the storage areas is being used by a first user of the weight scale identified by one of the designated user ID and the user information regarding the first user;
   display of the second image by the display unit of the weight scale to the user of the weight scale indicates to the user of the weight scale that a storage area corresponding to the second image among the storage areas is not being used by the first user identified by the one of the designated user ID and the user information regarding the first user; and
   display of the third image by the display unit of the weight scale to the user of the weight scale indicates to the user of the weight scale that a storage area corresponding to the third image among the storage areas is not being used by any user of the weight scale,
   the display of one of the first image, the second image and the third image thereby providing to the user of the weight scale visual indications of usage of the storage areas of the weight scale, and wherein
in step (d),
   the first image is displayed by the display unit of the weight scale for the storage area of the storage areas which stores the user configuration information regarding the first user of the weight scale identified by the one of the designated user ID and the user information regarding the first user, the second image different from the first image is displayed by the display unit of the weight scale for the storage area of the storage areas which stores the user configuration information regarding a second user of the weight scale who is different from the first user identified by the one of the designated user ID and the user information regarding the first user, and the third image different from the first image and the second image is displayed by the display unit of the weight scale for the storage area of the storage areas which stores the user configuration information indicating that the storage area corresponding to the third image is not being used by any user of the weight scale.

2. The information management method according to claim 1, wherein in step (d), if the designated user ID matches a user ID indicated by user configuration information in a storage area of the storage areas, or if no user ID is indicated by the user configuration information and a characteristic indicated by the user information nearly matches a characteristic of the user indicated by the user configuration information in the storage area, the first image is displayed for the storage area.

3. The information management method according to claim 1, wherein in step (d), if the designated user ID and a user ID indicated by user configuration information in a storage area of the storage areas do not match, or if no user ID is indicated by the user configuration information and a characteristic indicated by the user information and a characteristic of the user indicated by the user configuration information in the storage area do not nearly match, the second image is displayed for the storage area.

4. The information management method according to claim 2, wherein in step (d), a fourth image is displayed as the first image if the designated user ID-matches a user ID indicated by user configuration information in the storage area of the storage areas, and a fifth image different from the fourth image is displayed as the first image if no user ID is indicated by the user configuration information, and the characteristic indicated by the user information nearly matches the characteristic of the user indicated by the user configuration information in the storage area.

5. The information management method according to claim 3, wherein in step (d), a sixth image is displayed as the second image if the designated user ID and the user ID indicated by the user configuration information in the storage area of the storage areas do not match, and a seventh image different from the sixth image is displayed as the second image if no user ID is indicated by the user configuration information and the characteristic indicated by the user information and the characteristic of the user indicated by the user configuration information in the storage area do not nearly match.

6. The information management method according to claim 1, further comprising:

(e) obtaining history information indicating usage history of each of the storage areas from the weight scale; and (f) determining a priority level for each of the storage areas, using the obtained history information, wherein in step (d), priority information indicating the priority level determined for each of the storage areas is further displayed in association with the storage areas.

7. The information management method according to claim 1, wherein in step (d), the first image, the second image, and the third image are displayed in different background colors, different frame colors, or different text colors, or by different icons or different characters.

8. The information management method according to claim 1, further comprising:

(g) selecting a storage area of the storage areas that is associated with an image designated among the images displayed in step (d); and (h) storing the designated user ID or the user information into the selected storage area as user configuration information in the selected storage area.

9. The information management method according to claim 8, further comprising:

(i) displaying a screen for an inquiry as to whether to store the designated user ID or the user information if a storage area, which stores user configuration information indicating a user ID that does not match the designated user ID, is selected in step (g); and (j) receiving a response to the inquiry on the screen, wherein in step (h), the designated user ID or the user information is stored if the response to store the user information is received in step (j).

10. The information management method according to claim 8, further comprising:

(k) obtaining a pin code stored in the selected storage area; and (l) receiving a designated pin code, wherein in step (h), if the designated pin code received in step (l) and the pin code obtained in step (k) match, the designated user ID or the user information is stored.

11. An information management device for managing storage areas of a weight scale which includes a display unit to display images, comprising:

a user configuration information obtaining unit configured to obtain user configuration information stored in each of the storage areas of the weight scale including the storage areas, the user configuration information being information on a user of the weight scale stored in the storage area;

a designated user ID receiving unit configured to receive a designated user ID which is a user ID that has been designated;

a user information obtaining unit configured to obtain user information indicating a characteristic of a user of the weight scale identified by the designated user ID; and an image display processing unit configured to display images each associated with a corresponding one of the storage areas, based on the designated user ID, the user information, and the user configuration information stored in the corresponding one of the storage areas, the images comprising a first image, a second image, and a third image which are different from one another, wherein display of the first image by the display unit of the weight scale to the user of the weight scale indicates to the user of the weight scale that a storage area corresponding to the first image among the storage areas is being used by a first user of the weight scale identified by one of the designated user ID and the user information regarding the first user;

display of the second image by the display unit of the weight scale to the user of the weight scale indicates to the user of the weight scale that a storage area corresponding to the second image among the storage areas is not being used by the first user identified by the one of the designated user ID and the user information regarding the first user; and display of the third image by the display unit of the weight scale to the user of the weight scale indicates to the user of the weight scale that a storage area corresponding to the third image among the storage areas is not being used by any user of the weight scale, the display of one of the first image, the second image and the third image thereby providing to the user of the weight scale visual indications of usage of the storage areas of the weight scale, and wherein the image display processing unit is configured to:

display the first image for the storage area of the storage areas which stores the user configuration information regarding the first user of the weight scale identified by the one of the designated user ID and the user information regarding the first user;

display the second image different from the first image for the storage area of the storage areas which stores the user configuration information regarding a second user of the weight scale who is different from the first user identified by the one of the designated user ID and the user information; and display the third image different from the first image and the second image for the storage area of the storage areas which stores user configuration information indicating that the storage area corresponding to the third image is not being used for any user of the weight scale.

12. A non-transitory computer-readable recoding media storing a program for managing storage areas of a weight scale which includes a display unit to display images, the program causing a computer to execute:

(a) obtaining user configuration information stored in each of the storage areas of the weight scale including the storage areas, the user configuration information being information on a user of the user stored in the storage area;

(b) receiving a designated user ID which is a user ID that has been designated;

(c) obtaining user information indicating a characteristic of a user of the weight scale identified by the designated user ID; and (d) displaying images each associated with a corresponding one of the storage areas, based on the designated user ID, the user information, and the user configuration information stored in the corresponding one of the storage areas, the images comprising a first image, a second image, and a third image which are different from one another, wherein display of the first image by the display unit of the weight scale to the user of the weight scale indicates to the user of the weight scale that a storage area corresponding to the first image among the storage areas is being used by a first user of the weight scale identified by one of the designated user ID and the user information regarding the first user;

display of the second image by the display unit of the weight scale to the user of the weight scale indicates to the user of the weight scale that a storage area corresponding to the second image among the storage areas is not being used by the first user identified by the one of the designated user ID and the user information regarding the first user; and display of the third image by the display unit of the weight scale indicates to the user of the weight scale that a storage area corresponding to the third image among the storage areas is not being used by any user of the weight scale, the display of one of the first image, the second image and the third image thereby providing to the user of the weight scale visual indications of usage of the storage areas of the weight scale, and wherein in step (d), the first image is displayed by the display unit of the weight scale for the storage area of the storage areas which stores user the configuration information regarding the first user of the weight scale identified by one of the designated user ID and the user information, the second image different from the first image is displayed by the display unit of the weight scale for a storage area of the storage areas which stores the user configuration information regarding a second user of the weight scale who is different from the first user identified by the one of the designated user ID and the user information regarding the first user, and the third image different from the first image and the second image is displayed for the storage area of the storage areas which stores the user configuration information indicating that the storage area corresponding to the third image is not being used by any user of the weight scale.

13. A program provision method for providing a program for managing storage areas of a weight scale which includes a display unit to display images, comprising:

(m) storing the program; and (n) providing the program, wherein the program causes a computer to execute:

(a) obtaining user configuration information stored in each of the storage areas of the weight scale including the storage areas, the user configuration information being information on a user of the weight scale stored in the storage area;

(b) receiving a designated user ID which is a user ID that has been designated;

(c) obtaining user information indicating a characteristic of a user of the weight scale identified by the designated user ID; and (d) displaying images each associated with a corresponding one of the storage areas, based on the designated user ID, the user information, and the user configuration information stored in the corresponding one of the storage areas, the images comprising a first image, a second image and a third image which are different from each other, wherein display of the first image by the display unit of the weight scale to the user of the weight scale indicates to the user of the weight scale that a storage area corresponding to the first image among the storage areas is being used by a first user of the weight scale identified by one of the designated user ID and the user information regarding the first user;

display of the second image by the display unit of the weight scale to the user of the weight scale indicates to the user of the weight scale that a storage area corresponding to the second image among the storage areas is not being used by the first user identified by the one of the designated user ID and the user information regarding the first user; and display of the third image by the display unit of the weight scale to the user of the weight scale indicates to the user of the weight scale that a storage area corresponding to the third image among the storage areas is not being used by any user of the weight scale, the display of one of the first image, the second image and the third image thereby providing to the user of the weight scale visual indications of usage of the storage areas of the weight scale, and wherein in step (d), the first image is displayed by the display unit of the weight scale for the storage area of the storage areas which stores user configuration information regarding the first user of the weight scale identified by the one of the designated user ID and the user information regarding the first user, the second image different from the first image is displayed by the display unit of the weight scale for the storage area of the storage areas which stores the user configuration information regarding a second user of the weight scale who is different from the first user identified by the one of the designated user ID and the user information regarding the first user, and the third image different from the first image and the second image is displayed by the display unit of the weight scale for the storage area of the storage areas which stores the user configuration information indicating that the storage area corresponding to the third image is not being used by any user of the weight scale.

* * * * *